US 9,860,297 B2

(12) United States Patent
Palin et al.

(10) Patent No.: US 9,860,297 B2
(45) Date of Patent: Jan. 2, 2018

(54) METHOD, APPARATUS, AND COMPUTER PROGRAM PRODUCT FOR MEDIA SELECTION FOR MOVING USER

(71) Applicant: Nokia Corporation, Espoo (FI)

(72) Inventors: Arto Palin, Viiala (FI); Jukka Reunamaki, Tampere (FI); Niko Kiukkonen, Veikkola (FI)

(73) Assignee: Nokia Technologies Oy, Espoo (FI)

( * ) Notice: Subject to any disclaimer, the term of this patent is extended or adjusted under 35 U.S.C. 154(b) by 214 days.

(21) Appl. No.: 14/293,179

(22) Filed: Jun. 2, 2014

(65) Prior Publication Data

US 2015/0350279 A1 Dec. 3, 2015

(51) Int. Cl.
*H04L 29/06* (2006.01)
*H04W 4/02* (2009.01)
(Continued)

(52) U.S. Cl.
CPC .......... *H04L 65/80* (2013.01); *H04L 65/4084* (2013.01); *H04W 4/023* (2013.01);
(Continued)

(58) Field of Classification Search
CPC . G06F 3/165; H04L 12/2838; H04L 65/1066; H04L 65/1069; H04L 65/4084; H04L 65/80; H04L 67/148; H04L 67/1068; H04L 67/1085; H04L 29/08648; H04L 29/08657; H04L 67/16; H04L 67/18; H04N 21/43615; H04R 27/00; H04W 4/023; H04W 4/028; H04W 4/06; H04W 4/008; H04W 8/08; H04W 8/14; H04W 36/0011;
(Continued)

(56) References Cited

U.S. PATENT DOCUMENTS 5,193,216 A 3/1993 Davis
5,471,671 A 11/1995 Wang et al.
(Continued)

FOREIGN PATENT DOCUMENTS

EP 2073514 6/2009
EP 2355563 8/2011
(Continued)

OTHER PUBLICATIONS

Opposition Response in European Application Patent No. 1 685 689, dated Sep. 28 , 2009.
(Continued)

*Primary Examiner* — Joshua Kading
(74) *Attorney, Agent, or Firm* — Locke Lord LLP

(57) ABSTRACT

In an example embodiment, a method includes scanning, by an apparatus, for wireless messages associated with presence of a mobile wireless device, while the apparatus is connected to a server. The apparatus reproduces content received from the server. The apparatus maintains measured signal strength of wireless messages received from the mobile wireless device. Then the apparatus relinquished reproducing content received from the server based on information relating to measured signal strength of wireless messages received by another wireless device from the mobile wireless device is greater than the maintained signal strength associated with the mobile wireless device.

17 Claims, 17 Drawing Sheets

(51) Int. Cl.
  *H04W 36/38* (2009.01)
  *H04W 36/24* (2009.01)
  *H04W 4/00* (2009.01)
(52) U.S. Cl.
  CPC ............ *H04W 4/028* (2013.01); *H04W 4/008* (2013.01); *H04W 36/24* (2013.01); *H04W 36/38* (2013.01)
(58) Field of Classification Search
  CPC ... H04W 36/06; H04W 36/165; H04W 36/30; H04W 36/18; H04W 72/04; H04W 40/12; H04W 40/28; H04W 76/04; H04W 76/043; H04W 84/10; H04W 84/18; H04W 84/22; H04W 4/02; H04W 4/021; H04W 48/04; H04W 48/20; H04W 60/00
  See application file for complete search history.

(56) References Cited

U.S. PATENT DOCUMENTS

| | | | |
|---|---|---|---|
| 5,530,702 | A | 6/1996 | Palmer et al. |
| 5,732,347 | A | 3/1998 | Bartle et al. |
| 6,816,063 | B2 | 11/2004 | Kubler et al. |
| 6,892,052 | B2 | 5/2005 | Kotola et al. |
| 7,075,412 | B1 | 7/2006 | Reynolds et al. |
| 7,151,764 | B1 | 12/2006 | Heinonen et al. |
| 7,519,682 | B2 | 4/2009 | Smith et al. |
| 7,775,432 | B2 | 8/2010 | Jalkanen et al. |
| 8,210,433 | B2 | 7/2012 | Jalkanen et al. |
| 8,547,867 | B2 | 10/2013 | Koo et al. |
| 9,047,054 | B1* | 6/2015 | Goldstein ............... G06F 3/165 |
| 2001/0045460 | A1 | 11/2001 | Reynolds et al. |
| 2002/0021809 | A1 | 2/2002 | Salo et al. |
| 2002/0022961 | A1 | 2/2002 | Sepanaho |
| 2002/0023264 | A1 | 2/2002 | Aaltonen et al. |
| 2002/0069406 | A1 | 6/2002 | Aaltonen et al. |
| 2002/0071436 | A1 | 6/2002 | Border et al. |
| 2002/0087997 | A1 | 7/2002 | Dahlstrom |
| 2002/0191998 | A1 | 12/2002 | Cremon et al. |
| 2003/0043041 | A1 | 3/2003 | Zeps et al. |
| 2003/0084177 | A1 | 5/2003 | Mulligan |
| 2003/0097304 | A1 | 5/2003 | Hunt |
| 2003/0120745 | A1 | 6/2003 | Katagishi et al. |
| 2003/0134653 | A1 | 7/2003 | Sarkkinen et al. |
| 2003/0220765 | A1 | 11/2003 | Ovary et al. |
| 2003/0228846 | A1 | 12/2003 | Berliner et al. |
| 2004/0193676 | A1 | 9/2004 | Marks |
| 2004/0203413 | A1 | 10/2004 | Harumoto |
| 2004/0225199 | A1 | 11/2004 | Evanyk et al. |
| 2005/0054290 | A1 | 3/2005 | Logan et al. |
| 2005/0073522 | A1 | 4/2005 | Aholainen et al. |
| 2006/0258338 | A1 | 11/2006 | Markki et al. |
| 2007/0047505 | A1 | 3/2007 | Wassingbo |
| 2007/0141984 | A1 | 6/2007 | Kuehnel et al. |
| 2007/0141985 | A1 | 6/2007 | Parkkinen et al. |
| 2007/0275746 | A1 | 11/2007 | Bitran |
| 2007/0291710 | A1 | 12/2007 | Fadell |
| 2008/0004021 | A1* | 1/2008 | Sanjay ................ H04L 12/2838 455/436 |
| 2008/0055632 | A1 | 3/2008 | Oshiumi et al. |
| 2008/0090606 | A1 | 4/2008 | Hwang et al. |
| 2008/0107054 | A1 | 5/2008 | Parts et al. |
| 2008/0146151 | A1 | 6/2008 | Lyu et al. |
| 2008/0242220 | A1 | 10/2008 | Wilson et al. |
| 2008/0311957 | A1 | 12/2008 | Jantunen et al. |
| 2010/0035567 | A1 | 2/2010 | Vin |
| 2010/0082784 | A1 | 4/2010 | Rosenblatt et al. |
| 2010/0093280 | A1 | 4/2010 | Ahn et al. |
| 2010/0105328 | A1 | 4/2010 | Ahn et al. |
| 2010/0144274 | A1 | 6/2010 | McDowall et al. |
| 2010/0211698 | A1 | 8/2010 | Krishnaswamy |
| 2010/0241529 | A1 | 9/2010 | Kim |
| 2010/0244587 | A1 | 9/2010 | Tiovola et al. |
| 2010/0250135 | A1 | 9/2010 | Li et al. |
| 2011/0022661 | A1 | 1/2011 | Alsina |
| 2011/0140864 | A1 | 6/2011 | Bucci |
| 2011/0140883 | A1 | 6/2011 | Yamashita |
| 2011/0235624 | A1 | 9/2011 | Scott et al. |
| 2011/0317586 | A1 | 12/2011 | Palanki et al. |
| 2011/0319022 | A1 | 12/2011 | Arad et al. |
| 2012/0015605 | A1 | 1/2012 | Sole |
| 2012/0017257 | A1 | 1/2012 | Lee et al. |
| 2012/0169473 | A1 | 7/2012 | Jalkanen et al. |
| 2012/0289157 | A1 | 11/2012 | Palin et al. |
| 2012/0289158 | A1 | 11/2012 | Palin et al. |
| 2012/0289159 | A1 | 11/2012 | Palin et al. |
| 2012/0289160 | A1 | 11/2012 | Palin et al. |
| 2013/0111120 | A1 | 5/2013 | Ananthakrishnan et al. |
| 2013/0260688 | A1 | 10/2013 | Palin et al. |
| 2014/0194062 | A1 | 7/2014 | Palin et al. |
| 2014/0380159 | A1* | 12/2014 | Reilly ..................... G06F 3/017 715/716 |
| 2015/0189426 | A1* | 7/2015 | Pang ....................... H04M 1/21 381/77 |
| 2015/0193198 | A1* | 7/2015 | Hutchings ............... G06F 3/165 700/94 |
| 2015/0195857 | A1* | 7/2015 | Pan ........................ H04W 4/008 455/41.3 |
| 2015/0256954 | A1* | 9/2015 | Carlsson ................ H04R 27/00 381/59 |

FOREIGN PATENT DOCUMENTS

| | | |
|---|---|---|
| EP | 2424281 | 2/2012 |
| WO | WO0051293 | 8/2000 |
| WO | WO0067221 | 11/2000 |
| WO | WO 01/45319 | 6/2001 |
| WO | WO01/52179 | 7/2001 |
| WO | WO 02/11074 | 2/2002 |
| WO | WO2004038938 | 5/2004 |
| WO | WO2007040398 | 4/2007 |
| WO | WO2008072057 | 6/2008 |
| WO | WO2009013646 | 1/2009 |
| WO | WO2009158663 | 12/2009 |
| WO | WO2012127095 | 9/2012 |
| WO | WO2013083868 | 6/2013 |
| WO | WO2013132134 A1 | 9/2013 |

OTHER PUBLICATIONS

International Search Report for International Application No. PCT/FI2013/050085 dated May 13, 2013.
International Search Report for International Application No. PCT/FI2012/050531—Date of Completion of Search: Sep. 3, 2012—4 pages.
European Search Report for European Patent Application No. 12166717.4-2412—dated Jul. 20, 2012.
Radio Frequency Identification RFID—A basic primer, AIM Inc. White Paper; Aug. 23, 2001; 17 pages; 1.2; The Association of the Automatic Identification and Data Capture Industry (AIM Inc.).
International Search Report for International Application No. PCT/FI2012/050442—Date of Completion of Search: Sep. 18, 2012—4 pages.
European Search Report for EP Application No. 08006467.8-2412/1965555 dated Nov. 2, 2011.
Extended European Search Report for European Patent Application No. 12167079.8-2412—dated Jul. 30, 2012.
Office Action for Korean Application No. 10-2006-7009441 dated Apr. 23, 2007.
Notice of Allowance for Korean Application No. 10-2006-7009441 dated Jan. 7, 2008.
Palin, A., et al., "VoIP call over WLAN with Bluetooth headset—multiradio interoperability solutions", 2005 IEEE Application No. 12167079.8-2412—Date of Completion of Search: Jul. 13, 2012, 12 pages.
"Bluetooth Specification Version 4.0", Jun. 30, 2010, pp. 380-767.
Widmer. P., "Smart Box Software Framework", Vision Document, Apr. 7, 2003, 23 pages.

(56) References Cited

OTHER PUBLICATIONS

Read RSSI Command, Sec. 7.5.4, Host Controller Interface Functional Specification, Bluetooth Specification Version 4.1 [vol. 2], pp. 813-814, Dec. 3, 2013.
Inquiry Result with RSSI Event, Sec. 7.7.33, Host Controller Interface Functional Specification, Bluetooth Specification Version 4.1 [vol. 2], pp. 892-893, Dec. 3, 2013.
Extended Inquiry Result Event (with RSSI), Sec. 7.7.38, Host Controller Interface Functional Specification, Bluetooth Specification Version 4.1 [vol. 2], pp. 902-904, Dec. 3, 2013.
LE Advertising Report Event (with RSSI), Sec. 7.7.65.2, Host Controller Interface Functional Specification, Bluetooth Specification Version 4.1 [vol. 2], pp. 938-939, Dec. 3, 2013.
Inquiry Response Notification Event (with RSSI), Sec. 7.7.74, Host Controller Interface Functional Specification, Bluetooth Specification Version 4.1 [vol. 2], p. 956, Dec. 3, 2013.

* cited by examiner

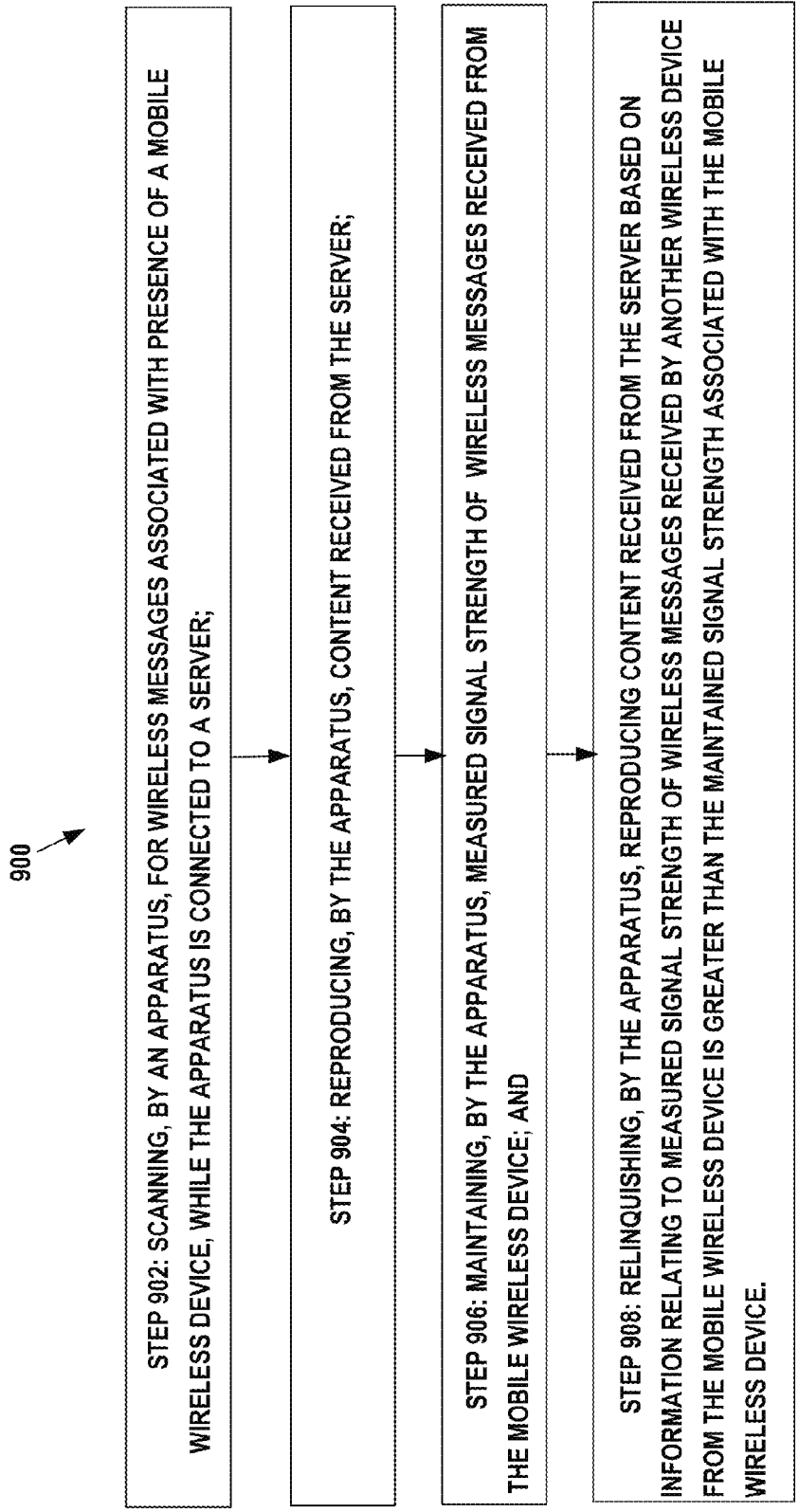

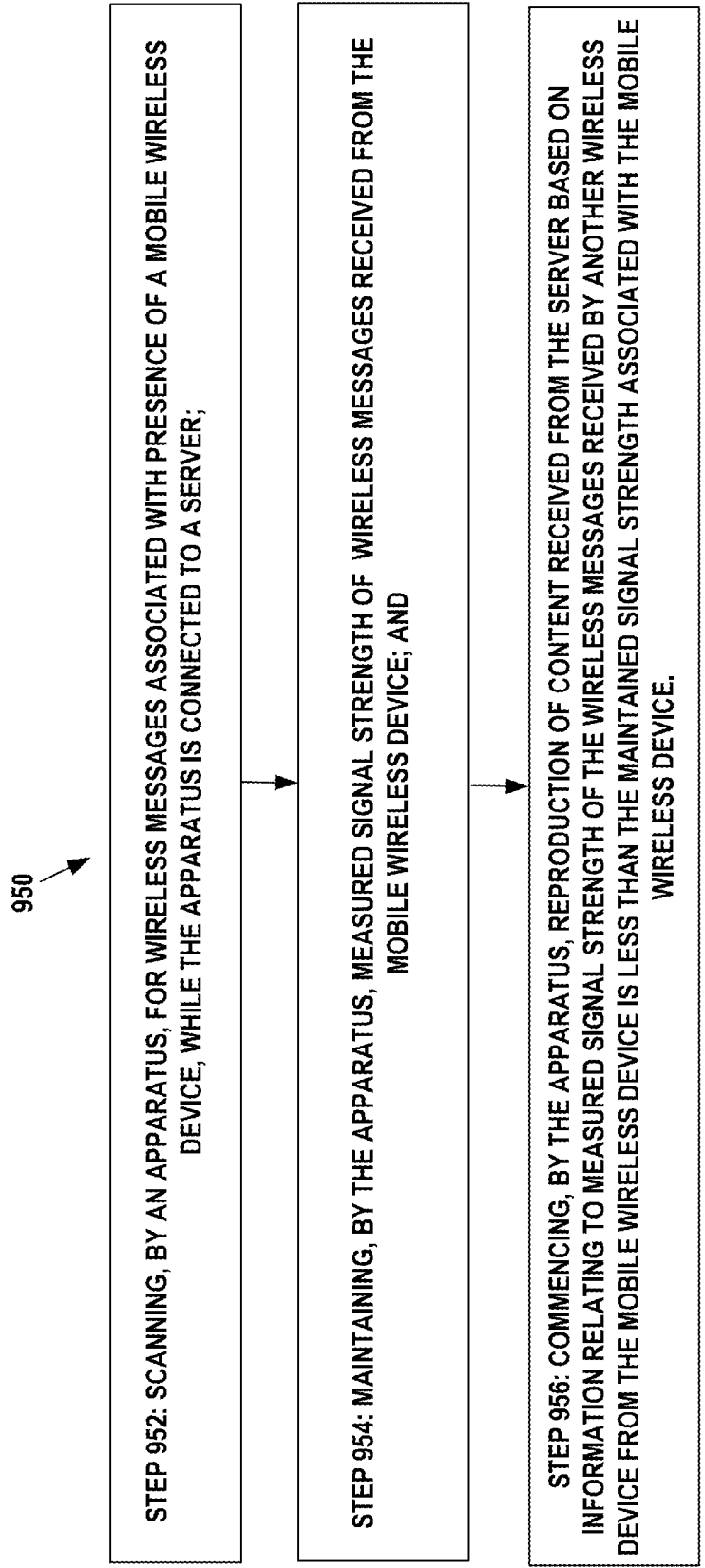

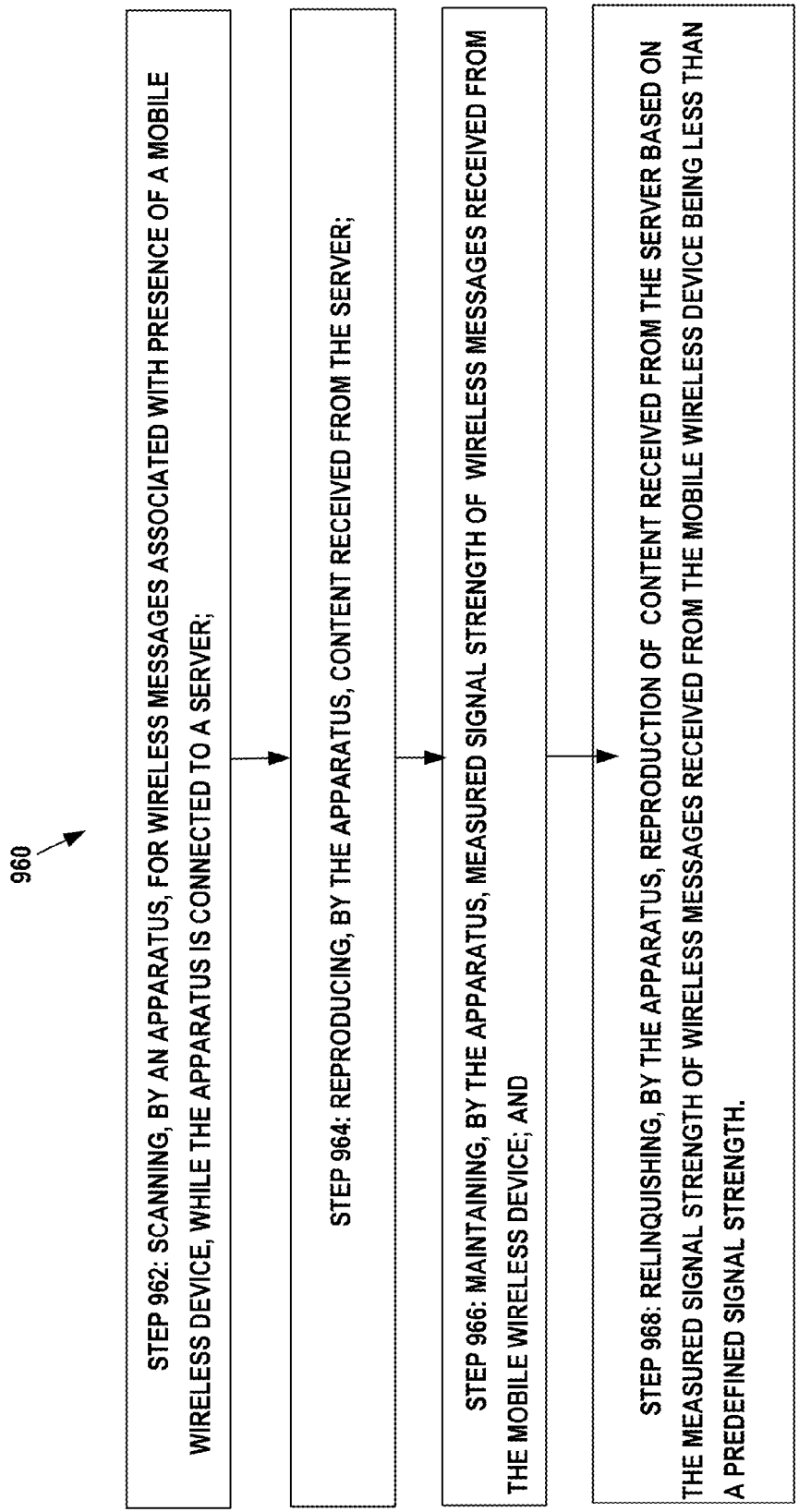

12
METHOD, APPARATUS, AND COMPUTER PROGRAM PRODUCT FOR MEDIA SELECTION FOR MOVING USER

FIELD

The technology field relates to controlling of media delivery and usage based on received information of detected apparatuses.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing electrical network as a power source. Due to rapid development of the wireless communication devices a number of areas capable of enabling entirely new types of communication applications have emerged.

An example of a wireless short-range communication technology is Bluetooth™ communication protocol, which operates in the 2.4 GHz ISM band. Bluetooth™ is a short-range radio network, originally intended as a cable replacement. Bluetooth™ Technical Specifications are published by the Bluetooth™ SIG, Inc. Bluetooth™ Specification version 2.0+EDR, published Oct. 15 2004 has the original functional characteristics of the first version Bluetooth™ Basic Rate (BR) and adds the Enhanced Data Rate (EDR) feature. Bluetooth™ Specification version 2.1+EDR, published Jul. 26 2007 for Basic Rate/Enhanced Data Rate (BR/EDR), added definitions for new features: Encryption Pause Resume, Erroneous Data reporting, Extended Inquiry Response, Link Supervision Timeout Event, Packet Boundary Flag, Secure Simple Pairing, Sniff Subrating. Bluetooth™ Specification version 3.0+HS, published Apr. 21 2009, updated the standard to integrate the Alternate MAC/PHY and Unicast Connectionless Data features.

The Bluetooth™ Core Specification, Version 4.0, Bluetooth™ SIG, Jun. 30, 2010 (incorporated herein by reference), includes the Extended Inquiry Response. An Extended Inquiry Response may be used to provide miscellaneous information during the inquiry response procedure. Data types may be defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information.

SUMMARY

Method, apparatus, and computer program product example embodiments enhance wireless communications device discovery processes.

An example embodiment of the invention includes a method comprising:

scanning, by an apparatus, for wireless messages associated with presence of a mobile wireless device, while the apparatus is connected to a server;

reproducing, by the apparatus, content received from the server;

maintaining, by the apparatus, measured signal strength of wireless messages received from the mobile wireless device; and relinquishing, by the apparatus, reproducing content received from the server based on information relating to measured signal strength of wireless messages received by another wireless device from the mobile wireless device is greater than the maintained signal strength associated with the mobile wireless device.

An example embodiment of the invention includes a method comprising:

receiving, by the apparatus, the information relating to the measured signal strength of wireless messages received by the other wireless device from the mobile wireless device; and comparing, by the apparatus, the received information relating to measured signal strength of wireless messages received by the other wireless device, with the maintained signal strength associated with the mobile wireless device.

An example embodiment of the invention includes a method comprising:

wherein the information relating to the measured signal strength of wireless messages received by the other wireless device, is received from at least one of the other wireless device or the server.

An example embodiment of the invention includes a method comprising:

wherein the relinquishing reproducing content received from the server is performed when the information relating to measured signal strength of the wireless messages received by the other wireless device is greater than the maintained signal strength associated with the first wireless device, by a predefined margin or by a predefined margin for a predefined interval.

An example embodiment of the invention includes a method comprising:

scanning, by an apparatus, for wireless messages associated with presence of a mobile wireless device, while the apparatus is connected to a server;

maintaining, by the apparatus, measured signal strength of wireless messages received from the mobile wireless device; and commencing, by the apparatus, reproduction of content received from the server based on information relating to measured signal strength of the wireless messages received by another wireless device from the mobile wireless device is less than the maintained signal strength associated with the mobile wireless device.

An example embodiment of the invention includes a method comprising:

receiving, by the apparatus, information relating to the measured signal strength of wireless messages received by the other wireless device from the mobile wireless device, wherein the other wireless device is currently reproducing content it receives over a connection from the server; and comparing, by the apparatus, the received information relating to measured signal strength of wireless messages received by the other wireless device, with the maintained signal strength associated with the mobile wireless device.

An example embodiment of the invention includes a method comprising:

wherein the information relating to a measured signal strength of wireless messages received by the other wireless device, is received from at least one of the other wireless device or the server.

An example embodiment of the invention includes a method comprising:

wherein the commencing reproduction of content received from the server is performed when the information relating to measured signal strength of the wireless messages received by the other wireless device is less than the maintained signal strength associated with the first wireless device, by a predefined margin or by a predefined margin for a predefined interval.

An example embodiment of the invention includes an apparatus comprising:

at least one processor;

at least one memory including computer program code;

the at least one memory and the computer program code configured to, with the at least one processor, cause the apparatus at least to:

scan for wireless messages associated with presence of a mobile wireless device, while the apparatus is connected to a server;

reproduce content received from the server;

maintain measured signal strength of wireless messages received from the mobile wireless device; and relinquish reproducing content received from the server based on information relating to measured signal strength of wireless messages received by another wireless device from the mobile wireless device is greater than the maintained signal strength associated with the mobile wireless device.

An example embodiment of the invention includes an apparatus comprising:

the at least one memory and the computer program code configured to, with the at least one processor, cause the apparatus at least to:

receive the information relating to the measured signal strength of wireless messages received by the other wireless device from the mobile wireless device; and compare the received information relating to measured signal strength of wireless messages received by the other wireless device, with the maintained signal strength associated with the mobile wireless device.

An example embodiment of the invention includes an apparatus comprising:

wherein the information relating to the measured signal strength of wireless messages received by the other wireless device, is received from at least one of the other wireless device or the server.

An example embodiment of the invention includes an apparatus comprising:

wherein the relinquishing reproducing content received from the server is performed when the information relating to measured signal strength of the wireless messages received by the other wireless device is greater than the maintained signal strength associated with the first wireless device, by a predefined margin or by a predefined margin for a predefined interval.

An example embodiment of the invention includes an apparatus comprising:

at least one processor;

at least one memory including computer program code;

the at least one memory and the computer program code configured to, with the at least one processor, cause the apparatus at least to:

scan for wireless messages associated with presence of a mobile wireless device, while the apparatus is connected to a server;

maintain measured signal strength of wireless messages received from the mobile wireless device; and commence reproduction of content received from the server based on information relating to measured signal strength of the wireless messages received by another wireless device from the mobile wireless device is less than the maintained signal strength associated with the mobile wireless device.

An example embodiment of the invention includes an apparatus comprising:

the at least one memory and the computer program code configured to, with the at least one processor, cause the apparatus at least to:

receive information relating to the measured signal strength of wireless messages received by the other wireless device from the mobile wireless device, wherein the other wireless device is currently reproducing content it receives over a connection from the server; and compare the received information relating to measured signal strength of wireless messages received by the other wireless device, with the maintained signal strength associated with the mobile wireless device.

An example embodiment of the invention includes an apparatus comprising:

wherein the information relating to a measured signal strength of wireless messages received by the other wireless device, is received from at least one of the other wireless device or the server.

An example embodiment of the invention includes an apparatus comprising:

wherein the commencing reproduction of content received from the server is performed when the information relating to measured signal strength of the wireless messages received by the other wireless device is less than the maintained signal strength associated with the first wireless device, by a predefined margin or by a predefined margin for a predefined interval.

An example embodiment of the invention includes a computer program product comprising computer executable program code recorded on a computer readable, non-transitory storage medium, the computer executable program code comprising:

code for scanning, by an apparatus, for wireless messages associated with presence of a mobile wireless device, while the apparatus is connected to a server;

code for reproducing, by the apparatus, content received from the server;

code for maintaining, by the apparatus, measured signal strength of wireless messages received from the mobile wireless device; and code for relinquishing, by the apparatus, reproducing content received from the server based on information relating to measured signal strength of wireless messages received by another wireless device from the mobile wireless device is greater than the maintained signal strength associated with the mobile wireless device.

An example embodiment of the invention includes a computer program product comprising computer executable program code recorded on a computer readable, non-transitory storage medium, the computer executable program code comprising:

code for scanning, by an apparatus, for wireless messages associated with presence of a mobile wireless device, while the apparatus is connected to a server;

code for maintaining, by the apparatus, measured signal strength of wireless messages received from the mobile wireless device; and code for commencing, by the apparatus, reproduction of content received from the server based on information relating to measured signal strength of the wireless messages received by another wireless device from the mobile wireless device is less than the maintained signal strength associated with the mobile wireless device.

An example embodiment of the invention includes a method comprising:

scanning, by an apparatus, for wireless messages associated with presence of a mobile wireless device, while the apparatus is connected to a server;

reproducing, by the apparatus, content received from the server;

maintaining, by the apparatus, measured signal strength of wireless messages received from the mobile wireless device; and relinquishing, by the apparatus, reproduction of content received from the server based on the measured signal strength of wireless messages received from the mobile wireless device being less than a predefined signal strength.

An example embodiment of the invention includes a method comprising:

scanning, by an apparatus, for wireless messages associated with presence of a mobile wireless device, while the apparatus is connected to a server;

maintaining, by the apparatus, measured signal strength of wireless messages received from the mobile wireless device; and commencing, by the apparatus, reproduction of content received from the server based on the measured signal strength of wireless messages received from the mobile wireless device being greater than a predefined signal strength.

An example embodiment of the invention includes an apparatus comprising:

at least one processor;

at least one memory including computer program code;

the at least one memory and the computer program code configured to, with the at least one processor, cause the apparatus at least to:

scan for wireless messages associated with presence of a mobile wireless device, while the apparatus is connected to a server;

reproduce content received from the server;

maintain measured signal strength of wireless messages received from the mobile wireless device; and relinquish reproduction of content received from the server based on the measured signal strength of wireless messages received from the mobile wireless device being less than a predefined signal strength.

An example embodiment of the invention includes an apparatus comprising:

at least one processor;

at least one memory including computer program code;

the at least one memory and the computer program code configured to, with the at least one processor, cause the apparatus at least to:

scan for wireless messages associated with presence of a mobile wireless device, while the apparatus is connected to a server;

maintain measured signal strength of wireless messages received from the mobile wireless device; and commence reproduction of content received from the server based on the measured signal strength of wireless messages received from the mobile wireless device being greater than a predefined signal strength.

An example embodiment of the invention includes a computer program product comprising computer executable program code recorded on a computer readable, non-transitory storage medium, the computer executable program code comprising:

code for scanning, by an apparatus, for wireless messages associated with presence of a mobile wireless device, while the apparatus is connected to a server;

code for reproducing, by the apparatus, content received from the server;

code for maintaining, by the apparatus, measured signal strength of wireless messages received from the mobile wireless device; and code for relinquishing, by the apparatus, reproduction of content received from the server based on the measured signal strength of wireless messages received from the mobile wireless device being less than a predefined signal strength.

An example embodiment of the invention includes a computer program product comprising computer executable program code recorded on a computer readable, non-transitory storage medium, the computer executable program code comprising:

code for scanning, by an apparatus, for wireless messages associated with presence of a mobile wireless device, while the apparatus is connected to a server;

code for maintaining, by the apparatus, measured signal strength of wireless messages received from the mobile wireless device; and code for commencing, by the apparatus, reproduction of content received from the server based on the measured signal strength of wireless messages received from the mobile wireless device being greater than a predefined signal strength.

The resulting example embodiments enhance wireless communications device discovery processes.

DESCRIPTION OF THE FIGURES

FIG. 9A is an illustration of an example flow diagram of an example process in the multimedia device B relinquishing reproducing content received over the wireless connection from the server when the received information relating to measured signal strength of the wireless messages received by the other wireless device A is greater than the maintained signal strength associated with the mobile wireless device, in accordance with at least one embodiment of the present invention.

FIG. 9B is an illustration of an example flow diagram of an example process in the multimedia device A, commencing reproduction of content received over the wireless connection from the server when the received information relating to measured signal strength of the wireless messages received by the other wireless device B is less than the maintained signal strength associated with the mobile wireless device, in accordance with at least one embodiment of the present invention.

FIG. 9C is an illustration of an example flow diagram 960 of an example process in the multimedia device 102B relinquishing reproducing content received from the streaming server 104 based on the measured signal strength of wireless messages received from the mobile wireless device being less than a predefined signal strength, in accordance with at least one embodiment of the present invention.

DISCUSSION OF EXAMPLE EMBODIMENTS OF THE INVENTION

Figure 1A:
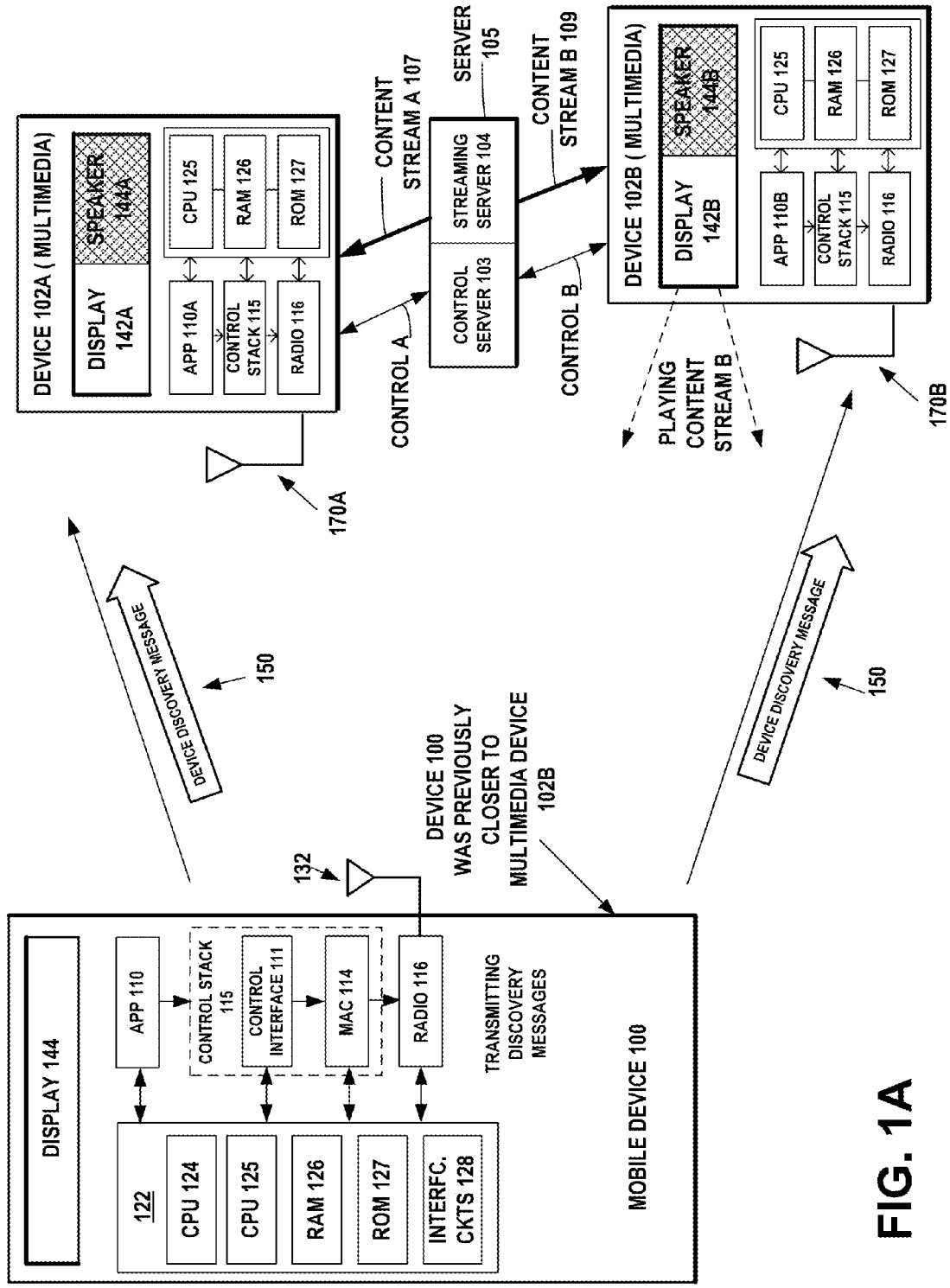
FIG. 1A is an illustration of an example embodiment of a network in a device discovery phase, with at least two discovering multimedia devices, such as audio speakers and/or video displays A and B, each detecting wireless device discovery messages received from a mobile wireless device. A multimedia device includes, in accordance with at least one example embodiment, at least an individual audio speaker or display device. Each multimedia device is scanning for wireless messages associated with the presence of the mobile wireless device, while at the same time each multimedia device is respectively connected to a streaming server that streams content to both multimedia devices. Since the mobile device was previously closer to the first multimedia device B, of the two multimedia devices, that previously closer multimedia device B is playing the content stream that it receives from the server, while the other multimedia device A is silent, in accordance with at least one embodiment of the present invention.

This section is organized into the following topics:
A. Wireless Short-Range Communication Networks
B. Connection Formation Between Bluetooth™ Devices
C. Touch-to-Select in Bluetooth Technology
D. Bluetooth™ Low Energy (LE) Technology
E. Media Selection For Moving User A. Wireless Short-Range Communication Networks Short-range communication technologies provide communication solutions appropriate for many data applications, without the cost, traffic and legislative concerns of longer-range communication technologies. Popular short-range communication technologies include Bluetooth basic rate/enhanced data rate (BR/EDR), Bluetooth Low Energy (LE), IEEE 802.11 wireless local area network (WLAN), Wireless Universal Serial Bus (WUSB), ZigBee (IEEE 802.15.4, IEEE 802.15.4a), and near field communication technologies, such as radio frequency identification (RFID) and near field communication (NFC) technology that enable contactless identification and interconnection of wireless devices. Bluetooth Technology provides an example of wireless short-range communication establishment.

B. Connection Formation Between Bluetooth™ Devices

A procedure for forming connections between Bluetooth™ devices is described in the Bluetooth™ Specification, Version 4, Jun. 30, 2010. The Bluetooth™ Baseband is the part of the Bluetooth™ system that implements the Media Access Control (MAC) and physical layer procedures to support the connection formation, exchange of data information streams, and ad hoc networking between Bluetooth™ devices. Connection formation may include inquiry, inquiry scanning, inquiry response, in addition to paging, page scanning, and page response procedures.

1. Inquiry

Inquiry is a procedure where a Bluetooth™ device transmits inquiry messages and listens for responses in order to discover the other Bluetooth™ devices that are within the coverage area and set discoverable. Bluetooth™ devices use the inquiry procedure to discover nearby devices, or to be discovered by devices in their locality. A Bluetooth™ device that tries to find other nearby devices is known as an inquiring device and actively sends inquiry requests. Bluetooth™ devices that are available to be found are known as discoverable devices, listen or scan for these inquiry requests, and send responses. The inquiry procedure uses dedicated physical channels for the inquiry requests and responses. The inquiry procedure does not make use of any of the architectural layers above the physical channel, although a transient physical link may be considered to be present during the exchange of inquiry and inquiry response information.

Bluetooth™ devices communicate with one another over 79 physical channels. An inquiring device wanting to discover other devices repetitively probes a first set of 16 frequencies, probing two frequencies every 1250 microseconds. It repeats this at least 256 times. Then, it repetitively probes a second set of 16 frequencies. The inquiring device will repeat entire cycle at least two times. Of the 79 radio carriers, 32 are considered wake-up carriers and the inquiring device broadcasts inquiry packets on these 32 carrier frequencies.

During the inquiry procedure, the inquiring device or master transmits inquiry messages with the general or dedicated inquiry access code. The timing for inquiry is the same as for paging. The identity or ID packet consists of the inquiry access code (IAC). It has a fixed length of 68 bits. The receiver uses a bit correlator to match the received packet to the known bit sequence of the ID packet. In order to discover other devices a device may enter inquiry substate. In this substate, it may repeatedly transmit the inquiry message (ID packet) at different hop frequencies. The inquiry hop sequence is derived from the Lower Address Part (LAP) of the General Inquiry Access Code (GIAC). Thus, even when dedicated inquiry access codes (DIACs) are used, the applied hopping sequence is generated from the GIAC LAP. A device that allows itself to be discovered, may regularly enter the inquiry scan substate to respond to inquiry messages. During the inquiry substate, the discovering device collects the Bluetooth™ device addresses of all devices that respond to the inquiry message. In addition, the discovering device may also collect extended information (e.g. local name and supported services) from devices that respond with an extended inquiry response packet. It may then, if desired, make a connection to any one of the discovered devices by means of the page procedure described below. The inquiry message broadcast by the source does not contain any information about the source. However, it may indicate which class of devices should respond. There is one general inquiry access code (GIAC) to inquire for any device, and 63 values have been reserved as dedicated inquiry access codes (DIAC) that only inquire for a certain type of device. The inquiry access codes are derived from reserved Bluetooth™ device addresses. There is only one DIAC defined in the Bluetooth™ Specification, and it is called the Limited Inquiry Access Code (LIAC). The LIAC is only intended to be used for limited time periods in scenarios where both devices have been explicitly caused to enter this state, usually by user action.

Inquiry scan is a procedure where a Bluetooth™ device listens for inquiry messages received on its inquiry scan physical channel. A device using one of its inquiry scan channels changes the inquiry channel every 1.28 s until it receives an inquiry message on the current channel from another Bluetooth™ device. This is identified by the appropriate inquiry access code. The inquiry scanning device will then follow the inquiry response procedure to return a response to the inquiring device. The inquiry scan substate is very similar to the page scan substate. However, instead of scanning for the device's device access code, the receiver may scan for the inquiry access code long enough to completely scan for 16 inquiry frequencies. The inquiry procedure uses 32 dedicated inquiry hop frequencies according to the inquiry hopping sequence. These frequencies are determined by the general inquiry address. The phase is determined by the native clock of the device carrying out the inquiry scan. Instead of, or in addition to, the general inquiry access code, the device may scan for one or more dedicated inquiry access codes. However, the scanning may follow the inquiry scan hopping sequence determined by the general inquiry address. The inquiry scan interval shall be less than or equal to 2.56 s.

2. Inquiry Response

An inquiry response packet (frequency hop synchronization (FHS)) is transmitted from the inquiry scanning device or slave to the master after the slave has received an inquiry message. This packet contains information necessary for the inquiring master to page the slave and follows 625 microseconds after the receipt of the inquiry message. The inquiry response packet is received by the master at the hop frequency when the inquiry message received by the slave was first in the master-to-slave slot. The slave response substate for inquiries differs completely from the slave response substate applied for pages. When the inquiry message is received in the inquiry scan substate, the recipient may return an inquiry response (FHS) packet containing the recipient's device address (BD_ADDR) and other parameters. If the recipient has non-zero extended inquiry response data to send, it may return an extended inquiry response packet after the FHS packet. On the first inquiry message received in the inquiry scan substate the slave may enter the inquiry response substate. If the slave has non-zero extended inquiry response data to send it may return an FHS packet, with the extended inquiry response bit set to one, to the master 625 microseconds after the inquiry message was received. It may then return an extended inquiry response packet 1250 microseconds after the start of the FHS packet. If the slave's extended inquiry response data is all zeroes the slave may only return an FHS packet with the extended inquiry response bit set to zero.

A contention problem could arise when several devices are in close proximity to the inquiring device or master and all respond to an inquiry message at the same time. However, because every device has a free running clock it is highly unlikely that they all use the same phase of the inquiry hopping sequence. In order to avoid repeated collisions between devices that wake up in the same inquiry hop channel simultaneously, a device will back-off for a random period of time. Thus, if the device receives an inquiry message and returns an FHS packet, it will generate a random number, RAND, between 0 and MAX_RAND. For scanning intervals greater than or equal to 1.28 seconds MAX_RAND will be 1003, however, for scanning intervals less than 1.28 s MAX_RAND may be as small as 127. A profile that uses a DIAC may choose to use a smaller MAX_RAND than 1003 even when the scanning interval is greater than or equal to 1.28 s. The slave will return to the CONNECTION or STANDBY state for the duration of at least RAND time slots. Before returning to the CONNECTION and STANDBY state, the device may go through the page scan substate. After at least RAND slots, the device will add an offset of 1 to the phase in the inquiry hop sequence (the phase has a 1.28 second resolution) and return to the inquiry scan substate again. If the slave is triggered again, it will repeat the procedure using a new RAND. The offset to the clock accumulates each time an FHS packet is returned. During a period when the inquiry device is broadcasting inquiry packets, a slave may respond multiple times, but on different frequencies and at different times. Reserved synchronous slots should have priority over response packets; that is, if a response packet overlaps with a reserved synchronous slot, it will not be sent, but the next inquiry message is awaited. If a device has extended inquiry response data to send, but the extended inquiry response packet overlaps with a reserved synchronous slot, the FHS packet may be sent with the EIR bit set to zero.

The messaging during the inquiry routines is summarized as follows:

In step 1, the master transmits an inquiry message using the inquiry access code and its own clock.

In step 2, the slave responds with the FHS packet containing the slave's Bluetooth™ device address, native clock and other slave information. This FHS packet is returned at times that tend to be random. If the slave has non-zero extended inquiry response data to send it will return an FHS packet with the EIR bit set to one to the master 625 us after the inquiry message was received. It then returns an extended inquiry response packet 1250 us after the start of the FHS packet. FHS is always returned 625 us after inquiry message was received. But, consecutive FHS packets are returned according to this random process. The FHS packet is not acknowledged in the inquiry routine, but it is retransmitted at other times and frequencies as long as the master is probing with inquiry messages.

In step 3, if the slave has non-zero extended inquiry response data, it sends an extended inquiry response packet to the master.

The retransmission of the inquiry response can be received by the inquiring devices within roughly 80 or 640 ms depending on inquiry scan interval of the discovered device. The random backoff for devices using scanning interval <1.28 s is from 0 to 79,375 ms and for other devices from 0 to 639,375 ms. The device using the default inquiry interval is using the latter value range.

In order to collect responses from all devices in the range in an error-free environment, the inquiry substate may have to last for 10.24 s unless the inquirer collects enough responses and aborts the inquiry substate earlier. If desired, the inquirer may also prolong the inquiry substate to increase the probability of receiving all responses in an error-prone environment. In consequence of long inquiry state compared to relatively short backoff times, multiple responses may be received from the single device.

3. Extended Inquiry Response

An Extended Inquiry Response may be used to provide miscellaneous information during the inquiry response procedure. Data types are defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information. If the slave transmits an extended inquiry response packet, it is transmitted 1250 microseconds after the start of the inquiry response packet. The extended inquiry response packet is received by the master at the hop frequency when the inquiry message received by the slave was first in the master-to-slave slot. The extended inquiry response packet is an Asynchronous Connection-oriented Logical transport (ACL) packet with type DM1, DM3, DM5, DH1, DH3 or DH5. To minimize interference it is recommended to use the shortest packet that is capable of containing the data. The packet is sent on the same frequency as the FHS packet, 1250 microseconds after the start of the FHS packet. In the packet header, LT_ADDR may be set to zero. TYPE may be one of DM1, DM3, DM5, DH1, DH3 or DH5. FLOW, ARQN and SEQN may all be set to zero and ignored during receipt. The HEC LFSR may be initialized with the same DCI (default check initialization) as for the FHS packet. In the payload header, LLID may contain the value 10 (start of an L2CAP message or no fragmentation). FLOW may be set to zero and ignored upon receipt. The length of the payload body (LENGTH) may be smaller than or equal to 240 bytes. The CRC LFSR may be initialized with the same DCI as for the FHS packet. The data whitening LFSR may be initialized with the same value as for the FHS packet. The length of the payload body (LENGTH) may be smaller than or equal to 240 bytes. The CRC LFSR may be initialized with the same DCI as for the FHS packet. The data whitening LFSR may be initialized with the same value as for the FHS packet. The payload data has two parts, a significant part followed by a non-significant part. The significant part contains a sequence of data structures. The non-significant part contains all zero octets. The baseband may not change any octets in the significant part. When transmitting data, the non-significant part octets may be omitted from the payload. A device may store a single extended inquiry response packet. This packet may be used with all IACs.

4. Pane

Page is the initial phase of the connection procedure where a device transmits a train of page messages until a response is received from the target device, stopped by the host or a timeout occurs. Page scan is a procedure where a device listens for page messages received on its page scan physical channel. In forming a connection, the paging device will become the master and the page scan device will become the slave in a piconet. Initially, after the slave has received an inquiry message, an inquiry response packet is transmitted from the slave to the master. The inquiry response packet sent from the slave contains information necessary for the inquiring master to page the slave, such as Bluetooth™ device address of the slave device. The necessary information may be received by other means, such as Out-Of-Band pairing. Also the page is not always preceded with inquiry, because the address may be known beforehand (for example saved from previous connections). In the paging procedure, one the Bluetooth™ device that will become the master carries out a page procedure by transmitting page messages in connection request packets to the specified Bluetooth™ slave device that carries out a page scanning procedure to listen for connection request packets from the paging device. A connectable Bluetooth™ device listens for a page request on its page scan channel and, once received, enters into a sequence of exchanges with the paging device. In order for a device to connect to another device, it performs frequency hopping all page scan channel frequencies, sending a page request on each frequency and listening for a response. The page scan channel uses an access code derived from the scanning device's Bluetooth™ device address BD_ADDR to identify communications on the channel. The page scan channel uses a slower hopping rate than the hop rate of the paging device, using the Bluetooth™ device clock of the scanning device as an input. A device listening on its page scan channel remains passive until it receives a page request from another Bluetooth™ device, identified by the page scan channel access code. The two devices will then follow the page procedure to form a connection where the paging device is the master and the page scan device is the slave in a piconet. In order for a paging device to connect to another Bluetooth™ device, it uses the page scan channel of the target device in order to send page requests. If the paging device does not know the phase of the target device's page scan channel, it does not know the current hop frequency of the target device. Therefore, the paging device transmits page requests on each of the page scan hop frequencies and listens for a page response. This is done at a faster hop rate, allowing the paging device to cover all page scan frequencies in a short period of time. The paging device may have some knowledge of the target device's Bluetooth™ clock, such as indicated during a previous inquiry transaction between the two devices, and may be able to predict the phase of the target device's page scan channel. It may use this information to optimize the synchronization of the paging and page scanning process and speed up the formation of the connection.

5. Bluetooth™ RSSI

The received signal strength indicator (RSSI) is a measurement of the power present in a received radio signal. Bluetooth receiver circuits may include an RSSI detector circuit to measure the strength of an incoming signal and generate an output representing the signal strength. For example, the received RF signal may be amplified and downconverted to an intermediate frequency (IF); then channel selection is performed on the IF signal, and the power of the IF signal in the selected channel is measured as the receiver signal strength indicator (RSSI) value. If the Bluetooth receiver circuit supports RSSI, the accuracy may be +/−6 dBm or better.

RSSI Monitoring of Inquiry Response and Extended Inquiry Response Packets

During Bluetooth discovery, before a connection is created, the RSSI is measured from Inquiry Response (FHS) packets when it is received by an inquiring device if enabled by the host.

When the controller receives an Inquiry Response (FHS) without following an Extended Inquiry Response, an HCI Inquiry Result with RSSI event is sent by the controller to the host application, which indicates that a remote Bluetooth device has responded during the current Inquiry process. This event will be sent from the Controller to the Host as soon as an Inquiry Response from a remote device is received. The RSSI parameter is measured during the FHS packet returned by each responding slave.

When the controller receives an Inquiry Response (FHS) following with an Extended Inquiry Response, an HCI Extended Inquiry Result event is sent by the controller to the host application, which indicates that a remote Bluetooth device has responded during the current inquiry process with extended inquiry response data. This event will be sent from the Controller to the Host upon reception of an Extended Inquiry Response from a remote device. One single Extended Inquiry Response is returned per event. This event contains RSSI and inquiry response data for the remote device that responded to the latest inquiry. The RSSI parameter is measured during the FHS packet returned by each responding slave.

RSSI Monitoring of Data Packets Received Over a Connection

After the discovery phase is completed, once a Bluetooth device is connected to another Bluetooth device, the received signal strength indication (RSSI) may be used by a receiving device to monitor the received power level of the data communication packets received over the connection. The RSSI value is calculated from received packet in the Bluetooth physical layer, and may be read by the host application for example through the host controller interface (HCI) Read RSSI command, for example once per second.

The Read RSSI Command will read the value of the received signal strength indication (RSSI) for data communication packets received over the connection to another Bluetooth controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

Measuring Pathloss with the RSSI and the TX Power Level

The TX Power Level data field in the Extended Inquiry Response packet indicates the transmitted power level of the FHS and EIR packets at the transmitter of the sending device. The TX Power Level data field may be used to calculate path loss of a received packet when the receiving device measures the RSSI of the received FHS packet, using the following equation:

$$pathloss = Tx\ Power\ Level - RSSI\ of\ the\ inquiry\ response\ packet$$

For example, if Tx Power Level=+4 (dBm) and the RSSI on the inquiry response packet is −60 (dBm) then the total pathloss is +4−(−60)=+64 dB. If a second inquiry response packet were received at −40 dBm with a Tx Power Level data=+15 dBm the resulting pathloss would be +55 dB. An application may use these pathloss values to choose which device it thinks might be closer (the one with the lower pathloss value).

Unfortunately, due to fading and varying antenna, circuit, and chip characteristics, these resulting pathloss values may have some uncertainty. Some of the uncertainty (for example, due to fading) may be able to be alleviated if multiple inquiry response packets are received from the same device.

6. Bluetooth™ Host Controller Interface

The Bluetooth™ radio in a device may include the host controller interface that provides a command interface between the host application in the device and the link layer of the Bluetooth™ radio, also referred to as the controller, to enable access to hardware status and control registers of the Bluetooth™ radio.

The host controller interface (HCI) is described in the Bluetooth™ Core Specification. The Host will receive asynchronous notifications of HCI events from Host Controller Transport Layer. HCI events are used for notifying the Host when something occurs. When the Host discovers that an event has occurred, it will then parse the received event packet to determine which event occurred. The commands and events are sent between the Host and the Controller. These are grouped into logical groups by function.

The HCI provides a command interface between the host application in a device and the Bluetooth™ link layer, provides access to hardware status and control registers of the Bluetooth™ radio, and provides a uniform method of accessing the Bluetooth™ baseband capabilities.

Discovery Phase HCI Commands And Events

The device discovery group of commands and events allow a device to discover other devices in the surrounding area. The host controller interface includes the standard HCI Inquiry Result Event logic and HCI Extended Inquiry Result Event logic that recognizes the receipt of the FHS packet and the following EIR packet, respectively. Some of the HCI commands and events for device discovery are described as follows:

Inquiry Command

The HCI Inquiry command will cause the Bluetooth Controller to enter Inquiry Mode to transmit inquiry packets used to discover other nearby Bluetooth devices.

Inquiry Result Event

HCI Inquiry Result Event:

The inquiry result event indicates that a remote device has responded with an inquiry response (IR), i.e. with an FHS packet, during the current inquiry process. This event will be sent from the Bluetooth™ Controller to the Host as soon as an Inquiry Response from a remote device is received. The event parameters in the HCI inquiry result event include BD_ADDR and Class_of_Device of the remote responding device and Clock_Offset OFFSET(A,B) between the responding device and the inquiring device.

Inquiry Result with RSSI Event

The Inquiry Result with RSSI event indicates that a remote Bluetooth device has responded with an inquiry response (FHS) packet during the current Inquiry process. The event reported to the host includes the BD_ADDR address for the device that responded, the Class of Device for the device, the clock offset between the responding device and the receiving device, and the measured RSSI of the received inquiry response packet in units of dB. This is similar to the inquiry result event, but it includes the RSSI value calculated by the controller.

Extended Inquiry Result Event

HCI Extended Inquiry Result Event:

The extended inquiry result event indicates that another Bluetooth™ device has responded during the current inquiry process with extended inquiry response data. Data received in this event will be sent from the device's Controller to the Host upon reception of an EIR from a remote device. One single extended inquiry response is returned per event. The event reported to the host includes the received signal strength indication (RSSI) measurement and inquiry response data for the device that responded to the latest inquiry. The RSSI parameter is measured during the FHS packet returned by each responding device. If an extended inquiry response packet from the same remote device is correctly received in a later response, another event is generated. The Extended_Inquiry_Response data fields are not interpreted by the controller. The standard HCI Extended Inquiry Result Event logic performs the HCI extended inquiry result event procedure to extract the data from the received extended inquiry response packet and to send this data to the host application. The received EIR data extracted from the packet may be passed unaltered to the host application.

Read Inquiry Response Transmit Power Level Command

This command will read the inquiry response Transmit Power level data, expressed in a field of the EIR packet, indicating the power that was used to transmit the FHS and EIR data packets during the discovery phase.

HCI Write Extended Inquiry Response Command

The Write Extended Inquiry Response command writes the extended inquiry response to be sent to an inquiring device during the extended inquiry response procedure. The write extended inquiry response command will write the data that the device's host wishes to send in the extended inquiry response packet during inquiry response. The FEC_Required command parameter states if forward error correction (FEC) encoding is required. The initial value of the inquiry response data is all zero octets. The controller does not interpret the extended inquiry response data, but passes it on to the baseband medium access control and physical radio for transmission in an EIR packet.

Write Inquiry Transmit Power Level Command

The Write Inquiry Transmit Power Level command is used by the transmitting device to write the transmit power level used to transmit the inquiry data packets.

Connection Phase HCI Commands and Events

Read RSSI Command

After the discovery phase is completed, once a Bluetooth device is connected to another Bluetooth device, the received signal strength indication (RSSI) may be used by a receiving device to monitor the received power level of the data communication packets received over the connection. The RSSI value is calculated by the Bluetooth physical layer, and may be read by the host application through the host controller interface (HCI) Read RSSI command.

The Read RSSI command will read the value of the received signal strength indication (RSSI) for data communication packets received over the connection to another Bluetooth controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

The RSSI parameter in the Read RSSI command is a signed 8-bit value, and is interpreted as an indication of arriving signal strength at the antenna measured in dBm. This command reads the Received Signal Strength Indication (RSSI) value from the Controller. For a Basic Rate/Enhanced Data Rate (BR/EDR) Controller, a Connection_Handle is used as the Handle command parameter and return parameter. The RSSI parameter returns the difference between the measured Received Signal Strength Indication (RSSI) and the limits of the Golden Receive Power Range for a Connection_Handle to another BR/EDR Controller. The Connection_Handle must be a Connection_Handle for an ACL connection. Any positive RSSI value returned by the Controller indicates how many dB the RSSI is above the upper limit, any negative value indicates how many dB the RSSI is below the lower limit. The value zero indicates that the RSSI is inside the 20 dB-wide Golden Receive Power Range. The accuracy of the dB values will depend on the Bluetooth hardware. The only requirements for the hardware are that the BR/EDR Controller is able to tell whether the RSSI is inside, above or below the Golden Device Power Range. The RSSI measurement compares the received signal power with two threshold levels, which define the Golden Receive Power Range. The lower threshold level corresponds to a received power between −56 dBm and 6 dB above the actual sensitivity of the receiver. The upper threshold level is 20 dB above the lower threshold level to an accuracy of +/−6 dB. The meaning of the RSSI metric is an absolute receiver signal strength value in dBm to ±6 dBm accuracy. If the RSSI cannot be read, the RSSI metric is set to 127. (When the Read_RSSI command has completed, a Command Complete event is generated.)

Read Transmit Power Level Command

The Read Transmit Power Level command will read the values for the Transmit Power Level parameter for the specified Connection_Handle for data communication packets during the connection phase, in a range of −30 to +20 dBm.

C. Touch-to-Select in Bluetooth Technology

The Bluetooth Touch-to-select feature employs Received Signal Strength Indication (RSSI) information calculated from the FHS packet, which is used in determining that an inquiry scanning device is within "touch range", i.e. proximate or in close proximity of the inquiring device, and when a threshold for that close proximity is met. This may provide an "intent to share" or "touch to connect" feature.

The inquiring device may measure the signal strength (e.g., RSSI) of each response message from an inquiry scanning device, which may be used in ordering the responding devices. In this manner, the inquiry scanning device with the highest measured signal strength is listed first (e.g., wherein the measured signal strength may correlate to the distance between the inquiring device and the responding inquiry scanning device).

An inquiry scanning device receiving inquiry packets from an inquiring device may respond by transmitting an inquiry response FHS packet or an FHS packet followed by an EIR packet. The host in the inquiring device may recognize EIR events triggered by the responses. The reported EIR events may include RSSI measurement values made by the inquiring device on the received FHS packets. From the RSSI values, the host in the inquiring device may detect when an inquiry scanning device is most likely within "touching range", that is within a distance from the inquiring device that indicates touching-related operations may be executed.

It may also be possible to determine when an inquiry scanning device is moving closer to an inquiring device. The Bluetooth controller in the inquiring device may report the receipt of FHS and/or EIR inquiry responses to its host software stack as an HCI Inquiry Event that may contain the measurement of the RSSI performed on the received response. In instances where EIR responses are received, the Bluetooth controller in the inquiring device may report each received EIR as an HCI Extended Inquiry Result Event. When an inquiry scanning device moves closer to an inquiring device, the Bluetooth controller in the inquiring device may report an RSSI for each inquiry response, thereby enabling the inquiring device to track the changing RSSI levels of the scanning device and thus its relative movement. When the measured RSSI satisfies predetermined response criteria (e.g., including the RSSI being measured to be at or above a predetermined level), the corresponding scanning device may be selected for touch-related operations (e.g., expedited connection establishment).

The Bluetooth controller in an inquiring device reports the receipt of inquiry responses to its host, which also has Touch selection software running Typical response criteria may include RSSI values measured on the responses, being sensed above certain fixed threshold value, such as −30 dBm. Sensing a response packet having an RSSI of −30 dBm will then cause the Touch selection software in the inquiring device to trigger device selection, while an RSSI of −31 dBm will not. It may also be possible that responding inquiry scanning devices may send Tx power information in EIR packet, since this is an existing feature in the Bluetooth specification v4.0. In instances where Tx power information about the inquiry scanning device is available in the EIR packet, the predetermined response criteria may include an adjustable RSSI threshold value that accounts for variations in the Tx power. For example, the threshold value may be set at 30 dBm below the EIR Tx power, so that if the Tx power level in an FHS packet is +20 dBm then the threshold value that will trigger selection may be the FHS packet being measured at −10 dBm, or 30 dBm below of Tx power level. Secondly, to ensure that devices are maintained in close proximity, the predetermined response criteria may require that more than one EIR must have a sensed RSSI at or above a threshold value. In addition different thresholds may be used for different phases, for example, first the threshold value may be set above −45 dBm to select one or more candidate devices and then a second, more decisive threshold value may be set above −30 dBm.

The detected RSSI may also be a function of: [1] antenna location of the inquiry scanning device sending the signal and [2] antenna location of the inquiring device sensing the signal. The results may be improved if the antennas were brought into close proximity, which may require moving away from obstructions and changing the orientation of one or both devices.

D. Bluetooth™ Low Energy (LE) Technology

The Bluetooth™ Core Specification, Version 4.0 includes the Bluetooth LE protocol for products that require lower power consumption, lower complexity, and lower cost than would be possible using the BR/EDR protocol. Bluetooth LE is designed for applications requiring lower data rates and shorter duty cycles, with a very-low power idle mode, a simple device discovery, and short data packets. Bluetooth LE devices may employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

The Bluetooth LE protocol allows a star network topology in connections, where one device serves as a master for a plurality of slave devices. The master device dictates the connection timing and communication operations of the one or more slave devices. Bluetooth LE communicates over a total of 40 RF channels, each having a bandwidth of 2 MHz. Data communication between Bluetooth LE devices occurs in 37 pre-specified data channels, of the 40 RF channels. All data connection transmissions occur in connection events wherein a point-to-point connection is established between the master device and a slave device. In the Bluetooth LE protocol, a slave device provides data through Bluetooth LE communication to the master device to which it is connected. The remaining 3 channels, of the 40 RF channels, are advertising channels used by devices to advertise their existence and capabilities. The Bluetooth LE protocol defines a unidirectional connectionless broadcast mode on the advertising channels.

The Link Layer provides a state machine with the following five states: Standby State, Advertising State, Scanning State, Initiating State, and Connection State. The Link Layer state machine allows only one state to be active at a time. The Link Layer in the Standby State does not transmit or receive any packets and can be entered from any other state. The Link Layer in the Advertising State will be transmitting advertising channel packets and possibly listening to and responding to responses triggered by these advertising channel packets. A device in the Advertising State is known as an advertiser. The Advertising State can be entered from the Standby State. The Link Layer in the Scanning State will be listening for advertising channel packets from devices that are advertising. A device in the Scanning State is known as a scanner. The Scanning State can be entered from the Standby State. The Link Layer in the Initiating State will be listening for advertising channel packets from a specific device and responding to these packets to initiate a connection with that specific device. A device in the Initiating State is known as an initiator. The Initiating State can be entered from the Standby State. The Connection State of the Link Layer may be entered either from the Initiating State or the Advertising State. A device in the Connection State is known as being in a connection over a data channel. Within the Connection State, two roles are defined: the Master Role and the Slave Role. When a device in the Initiating State, enters the Connection State, it is in the Master Role, it exchanges data packets with a slave device in a data channel, and it defines the timings of transmissions. When a device in the Advertising State, enters the Connection State, it is in the Slave Role and exchanges data packets with a master device in a data channel, wherein the master device defines the timings of transmissions.

The Bluetooth LE radio operates in the unlicensed 2.4 GHz ISM band, in the same manner as does the Basic Rate/Enhanced Data Rate (BR/EDR) radio. Bluetooth LE supports very short data packets, from 10 octets to a maximum of 47 octets, giving it a low duty cycle. Bluetooth LE employs a frequency hopping transceiver with many frequency hopping spread spectrum (FHSS) carriers, with a bit rate of 1 Megabit per second (Mb/s).

Bluetooth LE employs two multiple access schemes: Frequency division multiple access (FDMA) and time division multiple access (TDMA). Forty (40) physical channels, separated by 2 MHz, are used in the FDMA scheme. Three (3) are used as advertising channels and 37 are used as data channels. A TDMA based polling scheme is used in which one device transmits a packet at a predetermined time and a corresponding device responds with a packet after a predetermined interval.

The physical channel is sub-divided into time units known as events. Data is transmitted between Bluetooth LE devices in packets that are positioned in these events. There are two types of events: Advertising and Connection events.

Devices that transmit advertising packets on the advertising Physical Layer (PHY) channels are referred to as advertisers. Devices that receive advertising on the advertising channels without the intention to connect to the advertising device are referred to as scanners. Devices that form a connection to another device by listening for connectable advertising packets, are referred to as initiators. Transmissions on the advertising PHY channels occur in advertising events.

In the Bluetooth™ Core Specification, Version 4.0, there are four advertising event types: connectable undirected advertising (ADV_IND), connectable directed advertising (ADV_DIRECT_IND), scannable undirected advertising (ADV_SCAN_IND), and non-connectable undirected advertising (ADV_NONCONN_IND). At the start of each advertising event, the advertiser sends an advertising packet corresponding to the advertising event type. The header of the advertising channel packet identifies the packet type in a four-bit PDU Type field encoding. There are seven values currently assigned to the four-bit PDU Type field, ranging from 0000 to 0110, with the values 0111 to 1111 being reserved for future use.

The scanner device, also referred to as the initiator device, that receives the advertising packet, may make a connect request (CONNECT_REQ) to the advertiser device on the same advertising PHY channel. The CONNECT_REQ request includes fields for access address AA, CRC, WinSize, WinOffset, Interval, Latency, Timeout, ChannelMap, Hop count, and sleep clock accuracy SCA. The four-bit PDU Type field in the header of the CONNECT_REQ advertising channel packet, is 0101. When the advertiser device accepts the CONNECT_REQ request, a point-to-point connection results between the scanner/initiator device that becomes the master device, and the advertiser device that becomes the slave device in a piconet. The master and the slave devices know at what time and in which frequency the connection is in operation. The data channel changes between every connection event and the start of connection events are spaced regularly with the connection interval that is provided in the CONNECT_REQ packet.

In the connectable undirected advertising (ADV_IND) channel packet, the ADV_IND PDU has a payload field containing AdvA and AdvData fields. The AdvA field contains the advertiser's public or random device address and the AdvData field may contain Advertising data from the advertiser's host. The PDU may be used in connectable undirected advertising events. The four-bit PDU Type field in the header of the ADV_IND advertising channel packet, is 0000.

In the connectable directed advertising (ADV_DIRECT_IND) channel packet, the ADV_DIRECT_IND PDU has the payload field containing AdvA and InitA fields. The AdvA field contains the advertiser's public or random device address. The InitA field is the address of the device to which this PDU is addressed. The InitA field may contain the initiator's public or random device address. The PDU may be used in connectable directed advertising events. This packet may not contain any host data. The four-bit PDU Type field in the header of the ADV_DIRECT_IND advertising channel packet, is 0001.

In a non-connectable undirected event type advertising channel packet, ADV_NONCONN_IND, a scanner device is allowed to receive information in the advertising channel packet, but scanner devices are not allowed to transmit anything in the advertising channels upon receiving the ADV_NONCONN_IND advertising channel packets. When the non-connectable undirected event type is used, non-connectable advertising indications ADV_NONCONN_IND packets are sent by the Link Layer. The non-connectable undirected event type allows a scanner to receive information contained in the ADV_NONCONN_IND from the advertiser. The advertiser may either move to the next used advertising channel index or close the advertising event after each ADV_NONCONN_IND that is sent. The four-bit PDU Type field in the header of the ADV_NONCONN_IND advertising channel packet, is 0010.

In the scannable undirected advertising (ADV_SCAN_IND) channel packet, the ADV_SCAN_IND PDU has the payload field containing AdvA and AdvData fields. The AdvA field contains the advertiser's public or random device address. The PDU may be used in scannable undirected advertising events. The AdvData field may contain Advertising Data from the advertiser's host. The four-bit PDU Type field in the header of the ADV_SCAN_IND advertising channel packet, is 0110.

In the Bluetooth™ Core Specification, Version 4.0, if the advertiser is using a connectable advertising event, an initiator may make a connection request using the same advertising PHY channel on which it received the connectable advertising packet. The advertising event is ended and connection events begin if the advertiser receives and accepts the request for a connection to be initiated. Once a connection is established, the initiator becomes the master device in a piconet and the advertising device becomes the slave device. Within a connection event, the master and slave alternate sending data packets using the same data PHY channel.

According to the Bluetooth Specification V4.0, Bluetooth LE device discovery involves different operational processes for devices with different roles. In particular:

Slave Device, being an advertiser, performs an advertising process during which the device repeatedly enters Advertising Events. The interval of each start of Advertising Event, Ta, composes of a fixed-length "advInterval" and a random-length "advDelay". In Advertising Event, the device sends advertising Packet Data Units (PDUs) in broadcasting channel 37, 38 and 39, respectively.

Master Device, being an initiator/scanner, performs the initiating/scanning process. An initiating/scanning process consists of repeated "scanInterval", each of which contains a "scanWindow". In a different "scanWindow", the device changes the RF module to receive the state and listens to advertising PDUs on different broadcasting channels; while out of the "scanWindow", it does routine scheduling, or turns off the RF module.

If any advertising PDU is received by an initiator/scanner, it means the initiator/scanner successfully discovers the advertising device. For the initiator, it can directly send back a "CONN_REQ" to establish a connection with that advertiser. For a scanner, it can send out a "SCAN_REQ" to ask for more information from that advertiser.

Example non-limited use cases for Bluetooth LE technology include sports and fitness, security and proximity and smart energy. Bluetooth LE technology is designed for devices to have a battery life of up to one year such as those powered by coin-cell batteries. These types of devices include watches that will utilize Bluetooth LE technology to display Caller ID information and sports sensors that will be utilized to monitor the wearer's heart rate during exercise. The Medical Devices Working Group of the Bluetooth SIG is also creating a medical devices profile and associated protocols to enable Bluetooth applications for Bluetooth LE devices.

A Bluetooth LE advertising channel may be shared by any number of Bluetooth LE devices. Any number of Bluetooth LE devices may transmit advertising packets while sharing the same three advertising PHY channels. In high-density environments, however, since there are a large number of nodes to be discovered, the probability of broadcasting conflict will inevitably increase, causing network access time to increase, and also lowering the energy efficiency of the whole network.

1. Bluetooth™ RSSI

The received signal strength indicator (RSSI) is a measurement of the power present in a received radio signal. Bluetooth receiver circuits may include an RSSI detector circuit to measure the strength of an incoming signal and generate an output representing the signal strength. For example, the received RF signal may be amplified and downconverted to an intermediate frequency (IF); then channel selection is performed on the IF signal, and the power of the IF signal in the selected channel is measured as the receiver signal strength indicator (RSSI) value. If the Bluetooth receiver circuit supports RSSI, the accuracy may be +/−6 dBm or better.

RSSI Monitoring of Bluetooth LE Packets

During Bluetooth discovery in Bluetooth LE, before a connection is created, the RSSI may be measured from advertising packets received in broadcasting channel 37, 38, or 39, when they are received by a scanning device, if enabled by the host.

When the controller receives an advertising packet, an HCI LE Advertising Report event is sent by the controller to the host application. The HCI LE Advertising Report event indicates that a Bluetooth device or multiple Bluetooth devices have been detected during an active scan or during a passive scan. The HCI LE Advertising Report event includes a parameter N that indicates the RSSI of the received packet, with N being one octet representing the magnitude of the RSSI, with a range in units of dBm of −127≤N≤+20. This event will be sent from the Controller to the Host as soon as an advertising packet from a remote device is received. The RSSI parameter is measured during the receipt of the advertising packet. This event contains RSSI and advertising packet data for the remote device.

RSSI Monitoring of Data Packets Received Over a Connection

After the discovery phase is completed, once a Bluetooth LE device is connected to another Bluetooth device, the received signal strength indication (RSSI) may be used by a receiving device to monitor the received power level of the data communication packets received over the connection. The RSSI value is calculated from received packet in the Bluetooth physical layer, and may be read by the host application for example through the host controller interface (HCI) Read RSSI command, for example once per second.

The Read RSSI Command will read the value of the received signal strength indication (RSSI) for data communication packets received over the connection to another Bluetooth LE controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

Measuring Pathloss with the RSSI and the TX Power Level

The TX Power Level data field in the Bluetooth LE advertising packet indicates the transmitted power level of the advertising packets at the transmitter of the sending device. The TX Power Level is reported to the host in response to the HCI LE Read Advertising Channel Tx Power Command. The TX Power Level data field may be used to calculate path loss of a received packet when the receiving device measures the RSSI of the received advertising packet, using the following equation:

$$pathloss = Tx\ Power\ Level - RSSI\ of\ the\ inquiry\ response\ packet$$

For example, if Tx Power Level=+4 (dBm) and the RSSI on the received packet is −60 (dBm) then the total pathloss is +4−(−60)=+64 dB. If a second packet were received at −40 dBm with a Tx Power Level data=+15 dBm the resulting pathloss would be +55 dB. An application may use these pathloss values to choose which device it thinks might be closer (the one with the lower pathloss value).

Unfortunately, due to fading and varying antenna, circuit, and chip characteristics, these resulting pathloss values may have some uncertainty. Some of the uncertainty (for example, due to fading) may be able to be alleviated if multiple packets are received from the same device.

2. Bluetooth™ Host Controller Interface

The Bluetooth™ radio in a device may include the host controller interface that provides a command interface between the host application in the device and the link layer of the Bluetooth™ radio, also referred to as the controller, to enable access to hardware status and control registers of the Bluetooth™ radio.

The host controller interface (HCI) is described in the Bluetooth™ Core 4.0 Specification. The Host will receive asynchronous notifications of HCI events from Host Controller Transport Layer. HCI events are used for notifying the Host when something occurs. When the Host discovers that an event has occurred, it will then parse the received event packet to determine which event occurred. The commands and events are sent between the Host and the Controller. These are grouped into logical groups by function.

The HCI provides a command interface between the host application in a device and the Bluetooth™ link layer, provides access to hardware status and control registers of the Bluetooth™ radio, and provides a uniform method of accessing the Bluetooth™ baseband capabilities.

Discovery Phase HCI Commands and Events

HCI LE Advertising Report Event

The Bluetooth LE device discovery group of commands and events allow a device to discover other devices in the surrounding area. The Bluetooth LE host controller interface includes the HCI LE Advertising Report event that indicates that a Bluetooth device or multiple Bluetooth devices have been detected during an active scan or during a passive scan.

Connection Phase HCI Commands and Events

HCI LE Read Advertising Channel Tx Power Command

The TX Power Level is reported to the host in response to the HCI LE Read Advertising Channel Tx Power Command. The TX Power Level data field may be used to calculate path loss of a received packet when the receiving device measures the RSSI of the received advertising packet.

After the discovery phase is completed, once a Bluetooth device is connected to another Bluetooth device, the received signal strength indication (RSSI) may be used by a receiving device to monitor the received power level of the data communication packets received over the connection. The RSSI value is calculated by the Bluetooth physical layer, and may be read by the host application through the host controller interface (HCI) Read RSSI command.

The Read RSSI command will read the value of the received signal strength indication (RSSI) for data communication packets received over the connection to another Bluetooth controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

The RSSI parameter in the Read RSSI command is a signed 8-bit value, and is interpreted as an indication of arriving signal strength at the antenna measured in dBm. This command reads the Received Signal Strength Indication (RSSI) value from the Controller. For Bluetooth LE transport, a Connection_Handle is used as the Handle command parameter and return parameter. The meaning of the RSSI metric is an absolute receiver signal strength value in dBm to ±6 dBm accuracy.

3. Bluetooth LE Proximity Profile

The Proximity Profile defines the behavior when a device moves away from a peer device so that the connection is dropped or the path loss increases above a preset level, causing an immediate alert. This alert may be used to notify the user that the devices have become separated. As a consequence of this alert, a device may take further action, for example to lock one of the devices so that it is no longer usable.

The Proximity Profile may also be used to define the behavior when the two devices come closer together such that a connection is made or the path loss decreases below a preset level.

The Proximity Profile defines two profile roles to enable devices to detect their proximity: the Proximity Reporter and the Proximity Monitor. The Proximity Reporter is a Generic Attribute Profile (GATT) server on the one device in the connection, which supports a Link Loss Service (mandatory), an Immediate Alert Service (optional), and a transmit (Tx) Power Service (optional). The Proximity Monitor is a GATT client on the peer device in the connection, which monitors the Radio Signal Strength Information (RSSI) of the connection to calculate the signal's path loss. The Proximity Monitor may use the information received from the Proximity Reporter's Tx Power Service to normalize the RSSI value, by subtracting the RSSI from the Tx Power Level. In order to trigger an alert on low RSSI, the Proximity Monitor constantly monitors RSSI.

The Proximity Monitor on one device may maintain a connection with the Proximity Reporter on the peer device and monitor the RSSI of this connection. The Proximity Monitor may calculate the path loss by subtracting the RSSI from the transmit power level of the device of the Proximity Reporter, as discovered using the Reading Tx Power procedure. If the path loss exceeds a threshold set on the Proximity Monitor, it may write in the Alert Level characteristic of the Immediate Alert service, using the GATT Write Without Response sub-procedure, to cause the Proximity Reporter to generate an alert. The Proximity Monitor may also generate an alert when the path loss exceeds the threshold. The duration of the alert may be implementation specific.

The Proximity Monitor specified in the Bluetooth Proximity Profile, may include the following functions:

Service Discovery from the peer device;
Characteristic Discovery from the peer device;
Configuration of Alert on Link Loss to the peer device;
Alert on Link Loss to the peer device;
Reading Tx Power from the peer device; and
Alert on Path Loss locally and to the peer device based on RSSI supervision.

If the path loss falls below a threshold set on the Proximity Monitor it may write in the Alert Level characteristic of the Immediate Alert service, using the GATT Write Without Response sub-procedure, to cause the Proximity Reporter to end the alert. When the path loss is below the threshold the Proximity Monitor should stop alerting.

If link loss occurs during this procedure, then the behavior defined in the Alert on Link Loss procedure may be used.

E. Media Selection for Moving User

It would be desirable to have a media device, such as an audio speaker, video device or gaming device, that is able to track the movement or proximity of the user's mobile device. It would be desirable to have a media device, such as an audio speaker, video device or gaming device, share this tracking information with other media devices. It would be desirable to have the media devices that are sharing this information, to compare the information on the movement of the user's mobile device and to select which media device would be the closest one to stream the playback of the media to the user.

As an example use case, it is enjoyable to listen to music or watch a video easily wherever the listener moves. In accordance with an example embodiment of the invention, music, video, or gaming content may be automatically distributed and switched between different audio output devices or video devices so that the presentation is played by the closest playback device. In accordance with an example embodiment of the invention, a playback device, such as a wireless audio speaker, video device, or other multimedia device, may scan for wireless messages associated with presence of a mobile wireless device, while the playback device is connected to a server. The playback device may reproduce the content received over the wireless connection from the server. The playback device may maintain the measured signal strength of wireless messages received from the mobile wireless device. The playback device may receive information relating to a measured signal strength of wireless messages received by another wireless playback device from the mobile wireless device. The playback device may compare the received information relating to measured signal strength of wireless messages received by the other wireless playback device, with the maintained signal strength it associates with the mobile wireless device. The playback device may relinquish reproducing the content received over the wireless connection from the server when the received information relating to measured signal strength of the wireless messages received by the other wireless playback device is greater than the maintained signal strength associated with the mobile wireless device.

In accordance with an example embodiment of the invention, the information relating to a measured signal strength of wireless messages received by the other wireless playback device, may be received from at least one of the other wireless playback device or the server. The playback device may relinquish reproducing content received from the server when the received information relating to measured signal strength of the wireless messages received by the other wireless playback device is greater than the maintained signal strength associated with the first wireless device, by a predefined margin or by a predefined margin for a predefined interval. The wireless messages are at least one of a Bluetooth inquiry response message or a Bluetooth Low Energy advertising message. The playback device and the other wireless playback device may be audio output devices, video devices, or other multimedia devices, including at least one of speakers and headphones, video devices, or gaming devices.

In accordance with another example embodiment of the invention, a playback device may scan for wireless messages associated with presence of a mobile wireless device, while the playback device is connected to a server. The playback device may maintain measured signal strength of wireless messages received from the mobile wireless device. The playback device may receive information relating to a measured signal strength of wireless messages received by another wireless playback device from the mobile wireless device, wherein the other wireless playback device is currently reproducing content it receives over a connection from the server. The playback device may compare the received information relating to measured signal strength of wireless messages received by the other wireless playback device, with the maintained signal strength associated with the mobile wireless device. The playback device commence reproduction of content received from the server when the received information relating to measured signal strength of the wireless messages received by the other wireless playback device is less than the maintained signal strength associated with the mobile wireless device. The information relating to a measured signal strength of wireless messages received by the other wireless playback device, may be received from at least one of the other wireless playback device or the server.

Short-range communication, such as the Bluetooth communication protocol, may be automatically distributed and switched between different wireless devices based on the proximity of the wireless device. In accordance with an example embodiment of the invention, an internal Touch-to-Select (T2S) principle enables Bluetooth devices to select a counterpart device for communication using a device selection scheme where the communication counterpart is selected based on a determined distance between the devices.

In accordance with an example embodiment of the invention, dedicated device discovery is employed during a service a connection, where a playback device monitors the signal strength of a mobile wireless device while in a service communication session with a server that is streaming content to the playback device. The playback device may automatically relinquish playing the content received over the service connection from the server, based on measured signal strengths of the device discovery messages from the mobile wireless device. In accordance with an example embodiment of the invention, while the playback device is playing content received in a communication session with the streaming server, signal strengths of the mobile wireless device are compared with information relating to measured signal strength of the wireless messages received by another playback wireless device. The playback device may relinquish playing the content and the other playback device may commence playing the content from the server, based on the largest measured signal strength for the device discovery messages from the mobile wireless device, which corresponds to the smallest distance to the mobile wireless device. In accordance with an example embodiment of the invention, the signal strength may be compared within a predefined margin or by a predefined margin for a predefined interval. In accordance with an example embodiment of the invention, the events of relinquishing and commencement of playing the content may also include a predefined delay before the actual event occurs between playback devices, so as to avoid unwanted hysteresis effects during unstable conditions.

FIG. 1A is an illustration of an example embodiment of a network in a device discovery phase, with at least two discovering devices, such as audio speakers and/or video devices or other multimedia devices 102A and 102B, each detecting wireless device discovery messages 150 received from a mobile wireless device 100. A multimedia device includes, in accordance with at least one example embodiment, at least an individual audio speaker or display device. Each multimedia device 102A and 102B is scanning for wireless messages 150 associated with the presence of the mobile wireless device 100, while at the same time each multimedia device 102A and 102B is respectively connected over a wireless connection 107 and 109 to a streaming server 104 that streams content to both multimedia devices 102A and 102B. Alternately, each multimedia device 102A and 102B may be respectively connected over a wired connection 107 and 109 to the streaming server 104, or alternately, it may be a combination of wired and wireless technologies. Alternately, one of the multimedia devices, for example multimedia device 102A, may include the server 104. Since the mobile device 100 was previously closer to the first multimedia device 102B, of the two multimedia devices, that previously closer multimedia device 102B is playing the content stream that it receives over connection 109 from the server 104, while the other multimedia device 102A is silent. Both multimedia devices 102A and 102B continue to be connected over the respective connections 107 and 109 to the streaming server 104 and continue to receive their respective streaming contents, but only the first multimedia device 102B is playing the content that it receives in FIG. 1A, in accordance with at least one embodiment of the present invention.

The mobile wireless device 100, such as a smart phone, transmits wireless device discovery messages 150. The multimedia devices 102A and 102B, scan for wireless device discovery messages 150. In an example embodiment of the invention, the wireless device discovery messages 150 may be a Bluetooth™ inquiry response message transmitted by the mobile wireless device 100 in response to an inquiry message transmitted by at least one of the multimedia devices 102A and 102B. In an example embodiment of the invention, the wireless device discovery messages 150 may be a Bluetooth™ Low Energy advertising message transmitted by the mobile wireless device 100.

Figure 10:
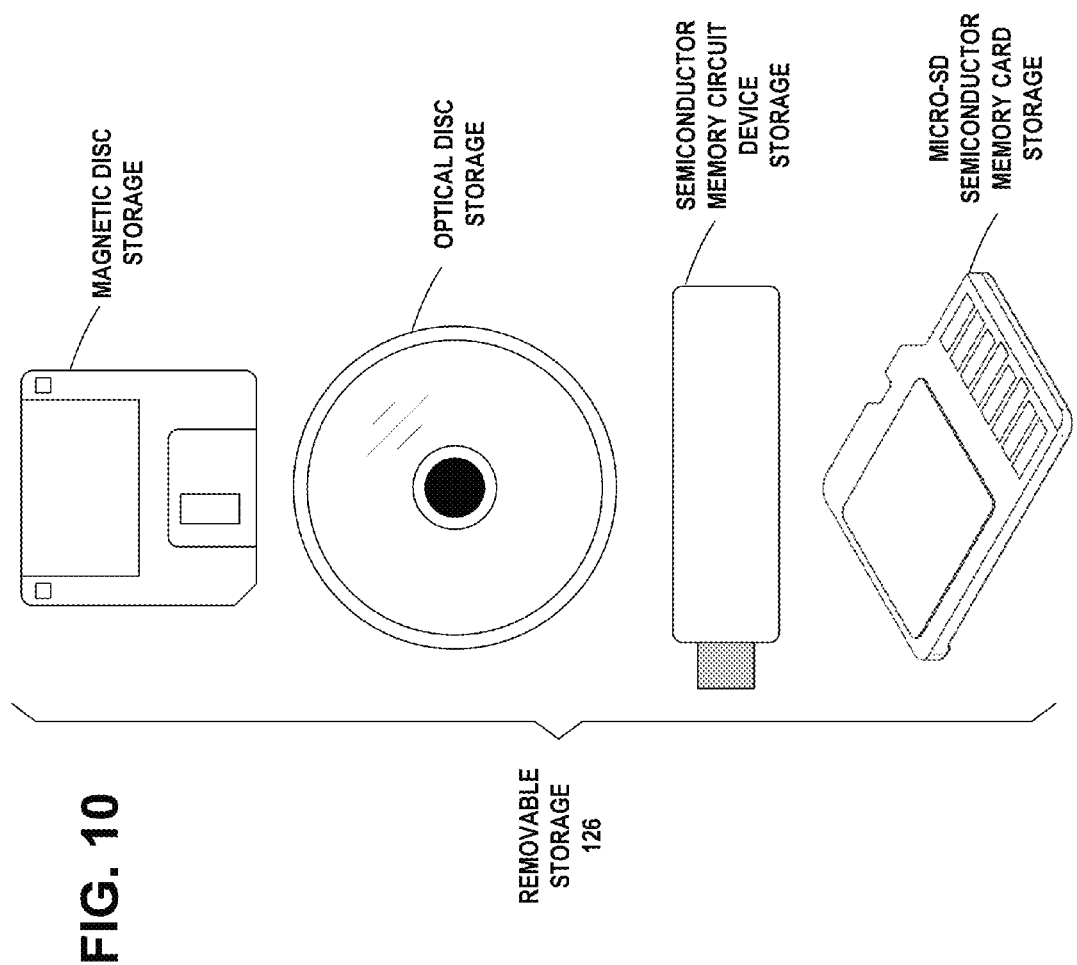
FIG. 10 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In example embodiments of the invention, the wireless mobile device 100 and the multimedia devices 102A and 102B may include a processor 122 that includes from one to many central processing units (CPUs) 124 and/or 125, a random access memory (RAM) 126, a read only memory (ROM) 127, and interface circuits 128 to interface with one or more radio transceivers 116, antenna 132, 170A, or 170B, and battery or house power sources. A smart phone may include a keypad, display 144, etc. A wireless multimedia device may include a video display device 142A and 142B and/or an audio output port 144A and 144B. The RAM and ROM can be removable memory devices such as smart cards, SIMs, WIMs, semiconductor memories such as RAM, ROM, PROMS, flash memory devices, etc., as shown in FIG. 10. In an example embodiment of the invention, the RAM 126 in the multimedia devices 102A and 102B may store a measurement of the characteristic RSSI of received wireless device discovery messages, such as 150.

In an example embodiment of the invention, the Bluetooth mobile wireless device 100 and the wireless multimedia devices 102A and 102B may include control stack 115 that includes a host controller interface (HCI) 111 that provides a command interface between the host respective application 110, 110A, and 110B in the device and the link layer or MAC 114. The control stack 115, also referred to as the controller, to enables access to hardware status and control registers of the Bluetooth radio 116. The host controller interface (HCI) is described in the Bluetooth™ Core Specification. The Host application 110, 110A, and 110B will receive asynchronous notifications of HCI events from HCI 111. HCI events are used for notifying the Host application 110, 110A, and 110B when something occurs. When the Host application discovers that an event has occurred, it will then parse the received event packet to determine which event occurred. The commands and events are sent between the Host application 110, 110A, and 110B and the radio 116. The HCI 111 provides a command interface between the host application 110, 110A, and 110B in a device and the Bluetooth link layer or MAC 114, provides access to hardware status and control registers of the radio 116, and provides a uniform method of accessing the Bluetooth baseband capabilities. In an example embodiment of the invention, the MAC 114 may be the Bluetooth basic rate/enhanced data rate (BR/EDR) protocol, the Bluetooth Low Energy (LE) protocol, or both protocols.

In an example embodiment of the invention, the mobile wireless device 100 outputs Bluetooth LE advertising packets on the advertising PHY channels in advertising events. During Bluetooth LE transmission, the RF signal is transmitted by the antenna 132.

In another example embodiment of the invention, the mobile wireless device 100 outputs Bluetooth protocol data units (PDU) or packets, such as inquiry response packets 150, for Bluetooth transmission. During Bluetooth transmission, the RF signal is transmitted by the antenna 132.

In an example embodiment of the invention, the mobile wireless device 100 may be, for example, a miniature device such as a key fob, smart card, jewelry, or the like. In an example embodiment of the invention, the mobile wireless device 100 may be, for example, a relatively larger cell phone, smart phone, flip-phone, PDA, graphic pad. The mobile wireless device 100 may also be in an automobile or other vehicle. The wireless multimedia devices 102A and 102B may be, for example, audio speakers, video displays, or gaming devices that are either in a fixed position or mobile. In embodiments, the relative sizes of devices 100, 102A and 102B may be arbitrary.

Figure 1B:
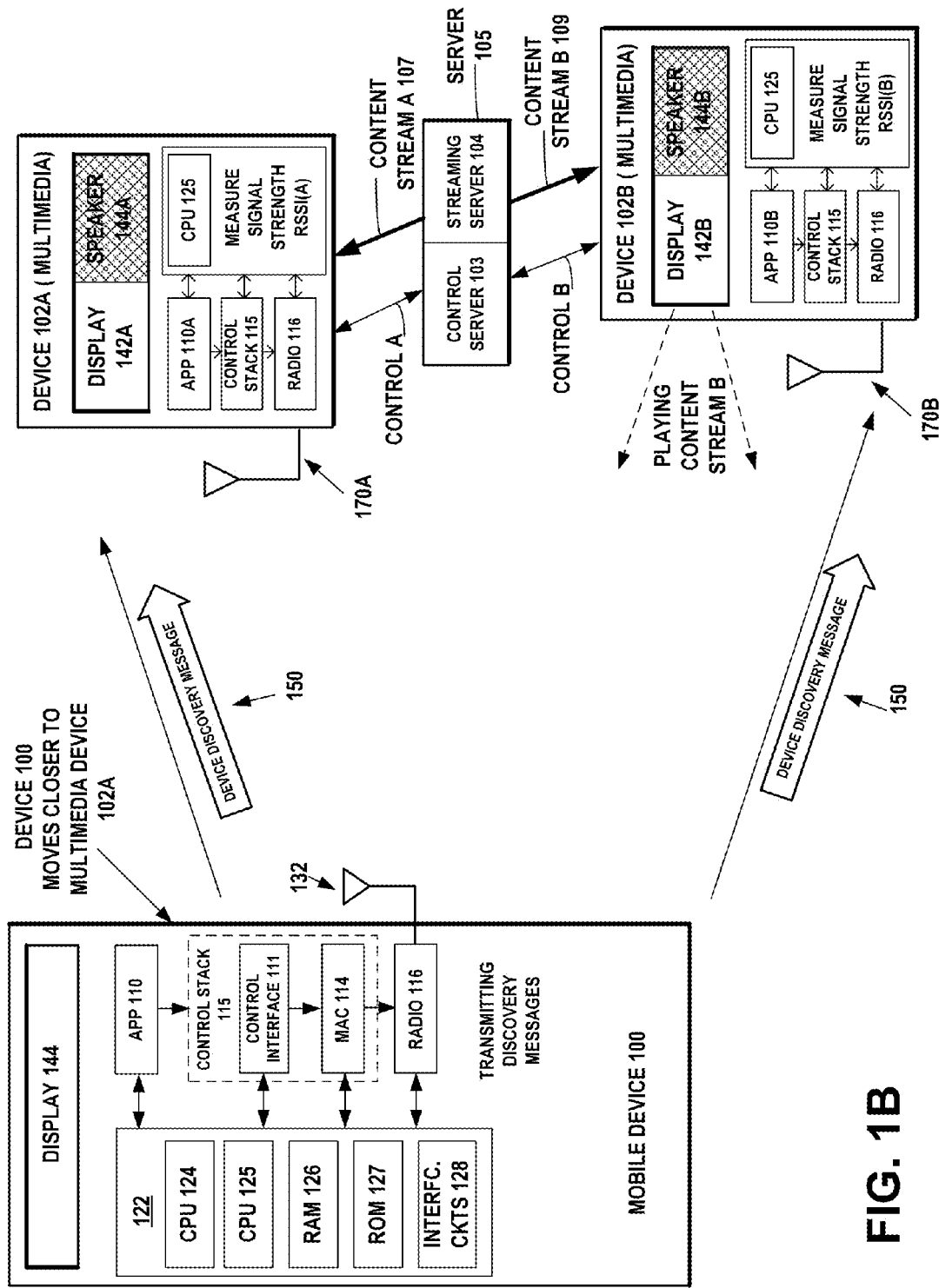
FIG. 1B is an illustration of an example embodiment of the network of FIG. 1A, wherein the mobile wireless device has moved closer to the second multimedia device A than to the first multimedia device B. Each discovering multimedia device measures a signal strength characteristic RSSI of its received wireless device discovery message. Each discovering multimedia device stores and maintains the characteristic RSSI of the wireless device discovery message that it receives. The previously closer multimedia device B continues to play the content stream that it receives from the server, while the other multimedia device A is silent, in accordance with at least one embodiment of the present invention.

FIG. 1B is an illustration of an example embodiment of the network of FIG. 1A, wherein the mobile wireless device 100 has moved closer to the second multimedia device 102A than to the first multimedia device 102B. Each discovering multimedia device 102A and 102B measures a signal strength characteristic RSSI of its received wireless device discovery message 150. Each discovering multimedia device stores and maintains in its RAM 126 the characteristic RSSI of the wireless device discovery message 150 that it receives. The previously closer multimedia device 102B continues to play the content stream B that it receives from the server 104, while the other multimedia device 102A is silent, in accordance with at least one embodiment of the present invention. Each discovering multimedia device 102A and 102B keeps on tracking the RSSI of the mobile wireless device 100 from discovery messages 150 and updates the stored value, respectively.

Figure 1C:
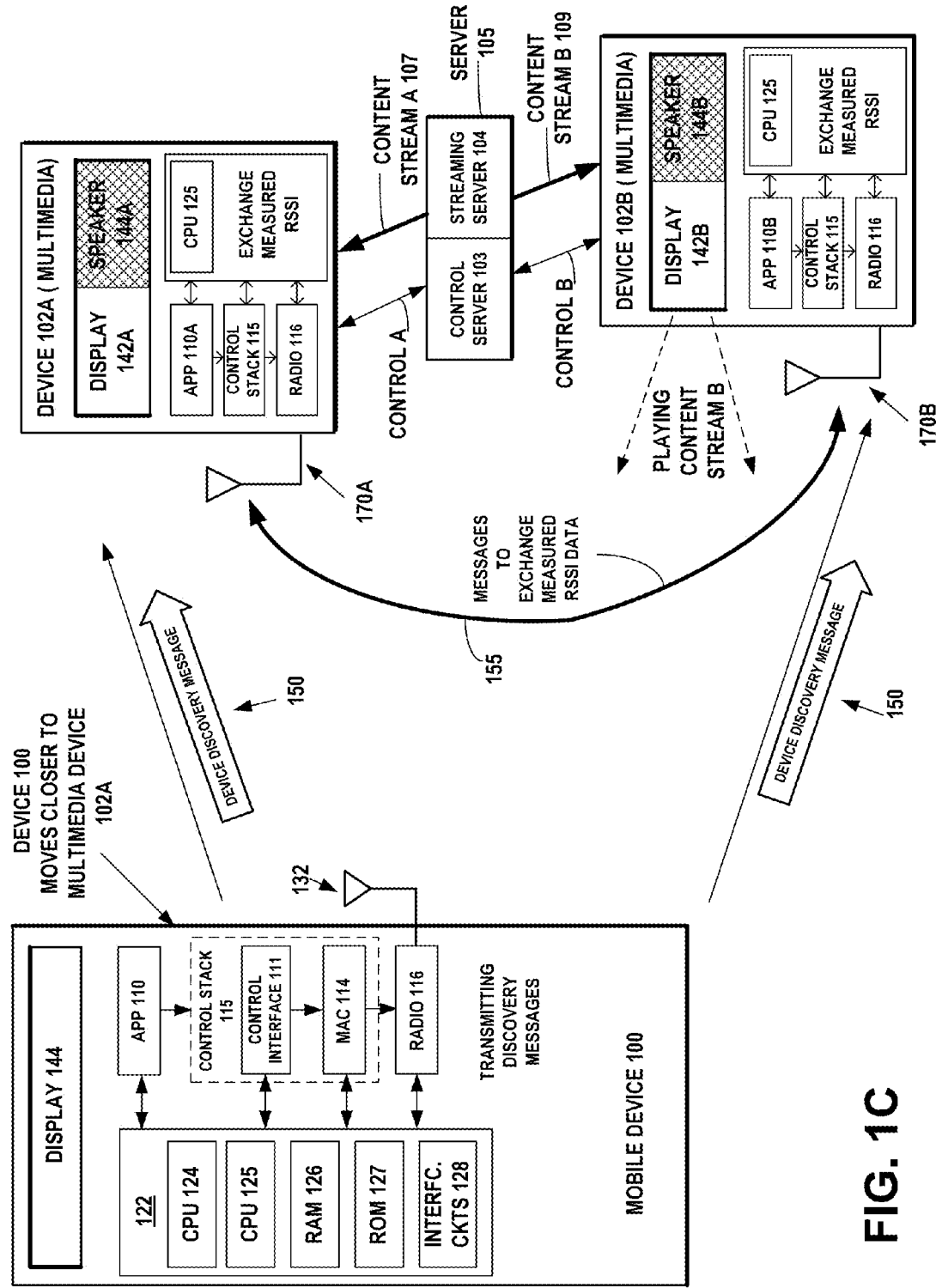
FIG. 1C is an illustration of an example embodiment of the network of FIG. 1B, wherein each discovering multimedia device exchanges information relating to its measured signal strength characteristic RSSI, with the other multimedia device by exchanging wireless messages. The previously closer multimedia device B continues to play the content stream that it receives from the server, while the other multimedia device A is silent, in accordance with at least one embodiment of the present invention.

FIG. 1C is an illustration of an example embodiment of the network of FIG. 1B, wherein each discovering multimedia device 102A and 102B exchanges information relating to its measured signal strength characteristic RSSI, with the other multimedia device by exchanging wireless messages 155. The multimedia devices 102A and 102B may alternately be connected together by a wired connection or a combination of wireless and wired technologies. The previously closer multimedia device 102B continues to play the content stream B that it receives from the server 104, while the other multimedia device 102A is silent, in accordance with at least one embodiment of the present invention. Each discovering multimedia device 102A and 102B keeps on tracking the RSSI of the mobile wireless device 100 from discovery messages 150 and updates the stored value, respectively.

In an example embodiment of the invention, the streaming server 104 streams content to both multimedia devices 102A and 102B. The control server 103 that controls the switching of the content between the first and the second multimedia devices 102A and 102B is locate in the multimedia device 102A and/or 102B. Each discovering multimedia device 102A and 102B sends to the control server 103, a report relating to its measured signal strength characteristic RSSI. The previously closer multimedia device 102B continues to play the content stream B that it receives from the streaming server 104, while the other multimedia device 102A is silent, in accordance with at least one embodiment of the present invention. The first and the second multimedia devices 102A and 102B continue to report to the control server 103, the RSSI of the mobile wireless device 100 from discovery messages 150 and the streaming server 104 updates the stored values, respectively.

The control server 103 may locate statically in one device or its location can change dynamically, for example, when device including control server 103 is turned off.

In another example embodiment of the invention, the streaming server 104 streams content to both multimedia devices 102A and 102B and the separate control server 103 controls the switching of the content between the first and the second multimedia devices 102A and 102B, via the Control A and Control B links. Each discovering multimedia device 102A and 102B sends to the control server 103, a report relating to its measured signal strength characteristic RSSI. The previously closer multimedia device 102B continues to play the content stream B that it receives from the streaming server 104, while the other multimedia device 102A is silent, in accordance with at least one embodiment of the present invention. The first and the second multimedia devices 102A and 102B continue to report to the control server 103, the RSSI of the mobile wireless device 100 from discovery messages 150 and the streaming server 104 updates the stored values, respectively.

In another example embodiment of the invention, a server 105 includes both the streaming server 104 and a control server 103. In this example embodiment, the streaming server 104 streams content to both multimedia devices 102A and 102B and the control server controls the switching of the content between the first and the second multimedia devices 102A and 102B, via the Control A and Control B links. Each discovering multimedia device 102A and 102B sends to the control server 103, a report relating to its measured signal strength characteristic RSSI. The previously closer multimedia device 102B continues to play the content stream B that it receives from the streaming server 104, while the other multimedia device 102A is silent, in accordance with at least one embodiment of the present invention. The first and the second multimedia devices 102A and 102B continue to report to the control server 103, the RSSI of the mobile wireless device 100 from discovery messages 150 and the control server 103 updates the stored values, respectively.

In another example embodiment of the invention, a server 105 including both the streaming server 104 and a control server 103 is located in multimedia device 102A and/or 102B. In this example embodiment, the streaming server 104 streams content to both multimedia devices 102A and 102B and the control server controls the switching of the content between the first and the second multimedia devices 102A and 102B, via the Control A and Control B links. Each discovering multimedia device 102A and 102B sends to the control server 103, a report relating to its measured signal strength characteristic RSSI. The previously closer multimedia device 102B continues to play the content stream B that it receives from the streaming server 104, while the other multimedia device 102A is silent, in accordance with at least one embodiment of the present invention. The first and the second multimedia devices 102A and 102B continue to report to the control server 103, the RSSI of the mobile wireless device 100 from discovery messages 150 and the control server 103 updates the stored values, respectively.

Figure 1D:
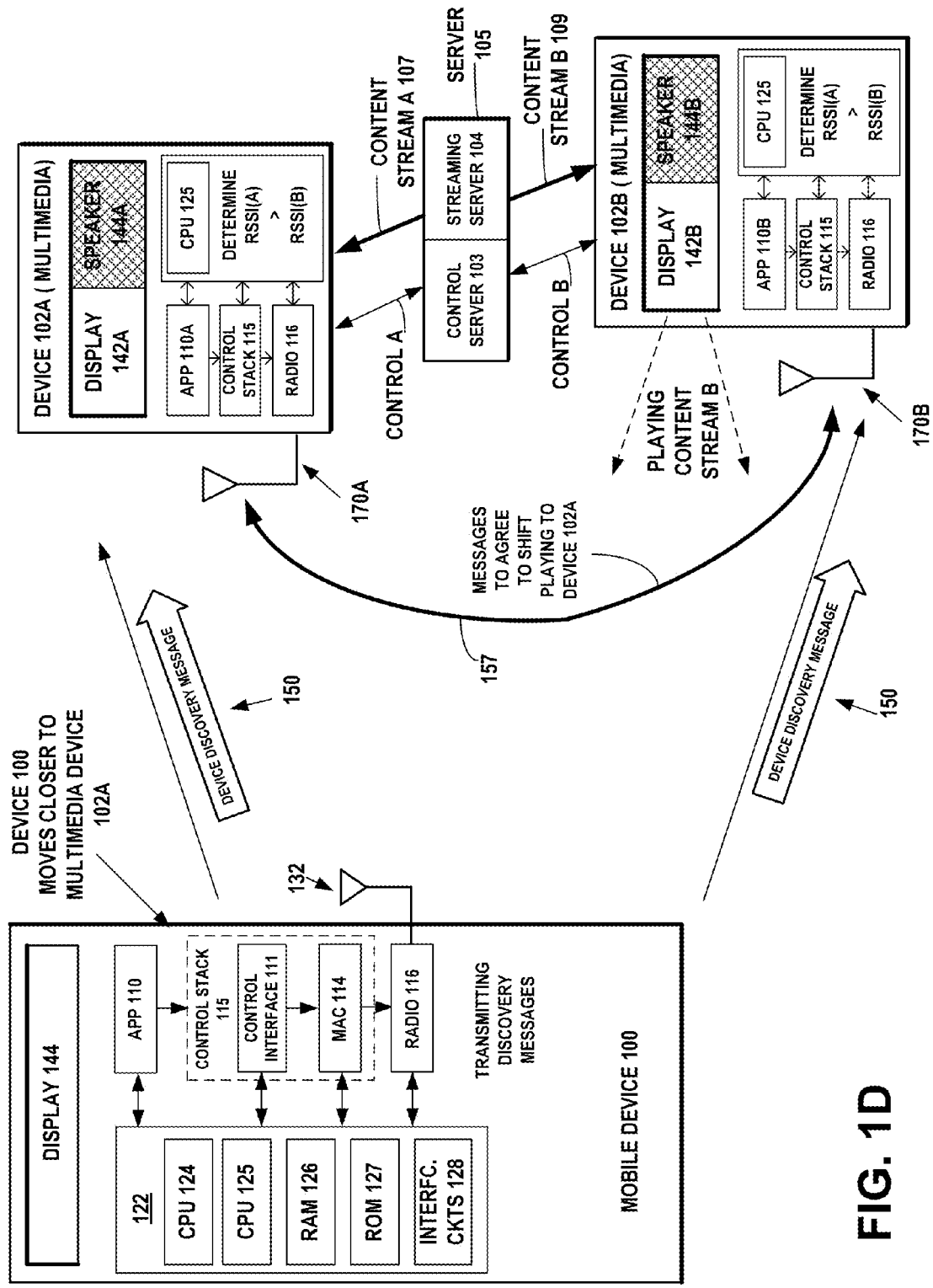
FIG. 1D is an illustration of an example embodiment of the network of FIG. 1C, wherein each of the discovering multimedia devices compares the received information relating to measured signal strength characteristic RSSI of wireless messages received by the other wireless device, with the maintained signal strength RSSI associated with the mobile wireless device. Both discovering multimedia devices determine that the received information relating to measured signal strength RSSI of the wireless messages received by the second multimedia device A is greater than the maintained signal strength RSSI that multimedia device B associates with the mobile wireless device.

FIG. 1D is an illustration of an example embodiment of the network of FIG. 1C, wherein each of the discovering multimedia devices 102A and 102B compares the received information relating to measured signal strength characteristic RSSI of wireless messages 150 received by the other wireless device, with the maintained signal strength RSSI associated with the mobile wireless device 100. Both discovering multimedia devices 102A and 102B determine that the received information relating to measured signal strength RSSI of the wireless messages 150 received by the second multimedia device 102A is greater than the maintained signal strength RSSI that multimedia device 102B associates with the mobile wireless device 100, because the mobile wireless device 100 has moved closer to the second multimedia device 102A than to the first multimedia device 102B.

Figure 1E:
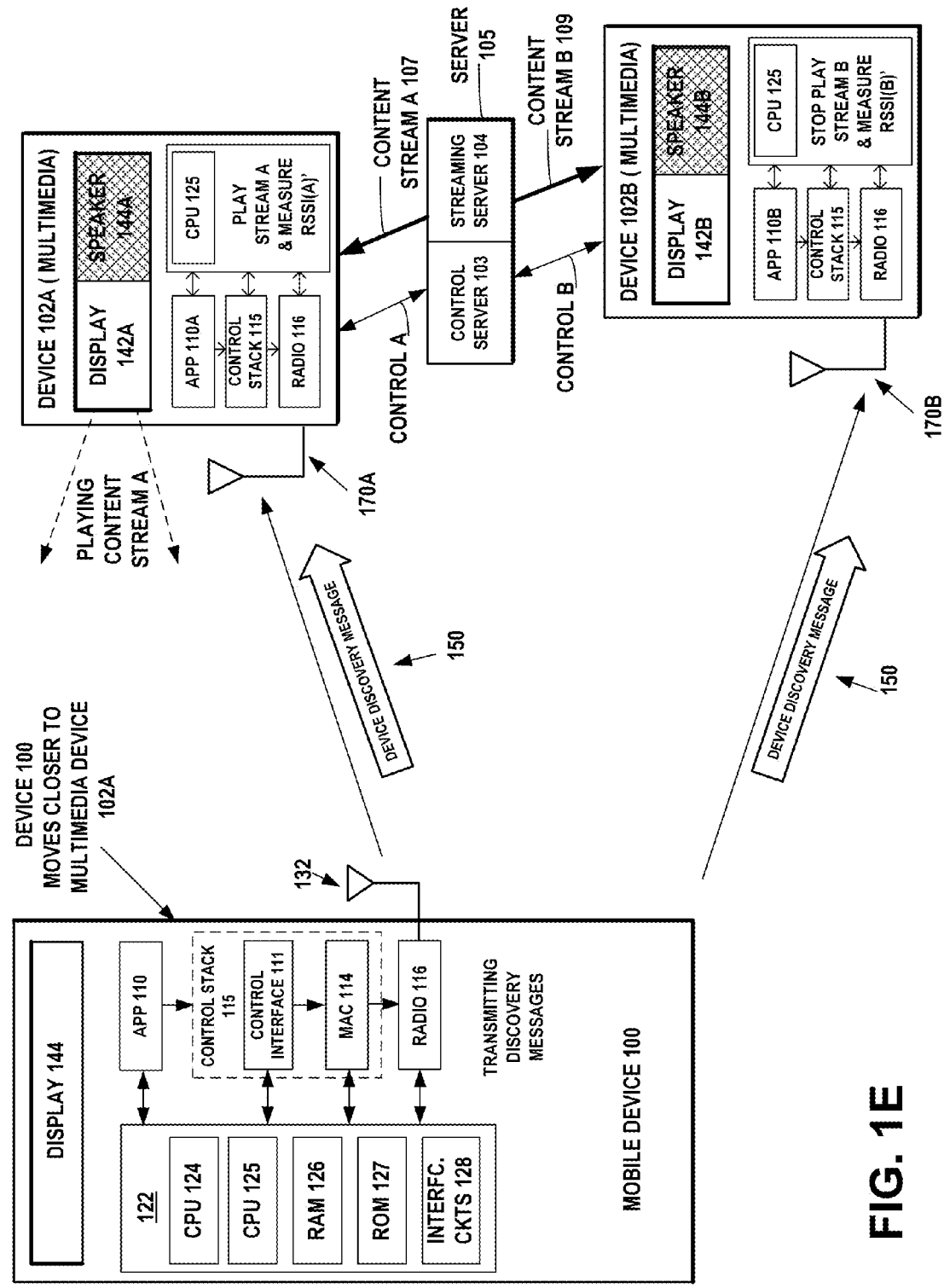
FIG. 1E is an illustration of an example embodiment of the network of FIG. 1D, wherein the first multimedia device B relinquishes reproducing the content received from the server and the second multimedia device A commences reproduction of the content received from the server, because of the determination that the received information relating to measured signal strength of the wireless messages received by the first multimedia device B device is less than the maintained signal strength that the second multimedia device A associates with the mobile wireless device. The second multimedia device A begins to play the content stream that it receives from the server because the mobile device in now closer to multimedia device A, whereas the first multimedia device B becomes silent since it is farther from the mobile device, in accordance with at least one embodiment of the present invention.

FIG. 1E is an illustration of an example embodiment of the network of FIG. 1D, wherein the first multimedia device 102B relinquishes reproducing the content B received over the connection 109 from the server 104 and the second multimedia device 102A commences reproduction of the content A received over the connection 107 from the server 104, because of the determination that the received information relating to measured signal strength of the wireless messages 150 received by the first multimedia device 102B is less than the maintained signal strength that the second multimedia device 102A associates with the mobile wireless device 100. The second multimedia device 102A begins to play the content stream A that it receives from the server 104 over connection 107, because the mobile wireless device 100 is now closer to multimedia device 102A. The first multimedia device 102B becomes silent since it is farther from the mobile wireless device 100, in accordance with at least one embodiment of the present invention.

In an example use case, the first multimedia device 102B may be a TV set, PC, laptop, or any other device having multimedia output capability located in the user's living room, and having network connectivity. The first multimedia device 102B is playing a movie video and the content is being streamed from the streaming server 104 located in the living room or elsewhere in the home. The user carries the mobile wireless device 100 that may be, for example, a key fob, smart card, smart phone, or the like. The second multimedia device 102A may be for example a second TV set that is located in the user's family room and is currently silent. As the user walks from the living room to the family room, each multimedia device 102A and 102B keeps on tracking the RSSI of the mobile wireless device 100 from its discovery messages 150. Each multimedia device 102A and 102B updates the stored RSSI value, respectively. As the user leaves the living room and approaches the family room, the first multimedia device 102B relinquishes playing the movie video content received from the streaming server 104 and the second multimedia device 102A commences playing the movie video content that it receives from the streaming server 104. Each multimedia device 102A and 102B has respectively determined that the received information relating to measured signal strength of the wireless messages 150 received by the first multimedia device 102B is less than the maintained signal strength that the second multimedia device 102A associates with the mobile wireless device 100. The second multimedia device 102A begins to play the content that it receives from the server 104, because the user and the mobile wireless device 100 are now closer to multimedia device 102A in the family room.

In another example embodiment, the mobile wireless device 100 that the user is carrying is a third multimedia device, such as a small electronic tablet device capable of receiving and playing video streams. A control server 103, tracks the relative position of the user's mobile wireless device 100 and when the first multimedia device 102A and second multimedia device 102B report that the user is beyond a predetermined distance to the devices 102A and 102B, the control server 103 activates the small electronic tablet device carried by the user, to play the movie video content. When the user approaches the family room, the control server 103, determines that the user is sufficiently close to the second multimedia device 102B and thus the control server 103 activates the second multimedia device 102B, to play the movie video content.

In another example embodiment, the mobile wireless device 100 that the user is carrying is a third multimedia device that tracks the relative position of the user's mobile wireless device 100. The third multimedia device may be a small electronic tablet device capable of receiving and playing video streams. When the first multimedia device 102A and second multimedia device 102B report that the user is beyond a predetermined distance to the devices 102A and 102B, the mobile wireless device 100 activates itself to play the movie video content. When the user approaches the family room, the mobile wireless device 100 determines that the user is sufficiently close to the second multimedia device 102B and thus the mobile wireless device 100 activates the second multimedia device 102B, to play the movie video content.

In an example alternate embodiment of the invention, there may be a predefined signal strength RSSI threshold that will initiate switching of the content between the first and the second multimedia devices 102A and 102B. In this example embodiment of the invention, the server 105 includes both the streaming server 104 and a control server 103. In this example embodiment, the streaming server 104 streams content to both multimedia devices 102A and 102B and either the control server 103 or the streaming server 104 controls the switching of the content between the first and the second multimedia devices 102A and 102B, via the Control A and Control B links. Each discovering multimedia device 102A and 102B sends to the control server 103 or the streaming server 104, a report relating to its measured signal strength characteristic RSSI. The previously closer multimedia device 102B continues to play the content stream B that it receives from the streaming server 104, while the other multimedia device 102A is silent. The first and the second multimedia devices 102A and 102B continue to report to the control server 103 or the streaming server 104, the RSSI of the mobile wireless device 100 from discovery messages 150 and the control server 103 or the streaming server 104 updates the stored values, respectively. The control server 103 or the streaming server 104 compares the reported RSSI values with a predefined signal strength RSSI threshold that will initiate switching of the content between the first and the second multimedia devices 102A and 102B. If the threshold is exceeded by the second multimedia device 102A, the control server 103 or the streaming server 104 signals the first multimedia device 102B over the Control B link, to relinquish reproducing the content B received over the connection 109 from the server 104. The control server 103 or the streaming server 104 then signals the second multimedia device 102A to commence reproduction of the content A received over the connection 107 from the server 104, because of the determination by the control server 103 or the streaming server 104 that the received information relating to measured signal strength of the wireless messages 150 received by the second multimedia device 102A exceeds the predefined signal strength RSSI threshold that will initiate switching of the content between the first and the second multimedia devices 102A and 102B, because the mobile wireless device 100 is now closer to multimedia device 102A. The first multimedia device 102B becomes silent since it is farther from the mobile wireless device 100, in accordance with at least one embodiment of the present invention.

In an example alternate embodiment of the invention, one of the multimedia devices 102A, includes control server 103. In this example embodiment, the streaming server 104 streams content to both multimedia devices 102A and 102B and the control server 103 in the multimedia device 102A, controls the switching of the content between the first and the second multimedia devices 102A and 102B. The multimedia device 102B sends to the control server 103 in the multimedia device 102A, a report relating to its measured signal strength characteristic RSSI. The multimedia device 102A provides to the control server 103 within itself, a report relating to its measured signal strength characteristic RSSI. The control server 103 within multimedia device 102A, continues updating the stored values. The previously closer multimedia device 102B continues to play the content stream B that it receives from the streaming server 104, while the multimedia device 102A is silent. The multimedia device 102B relinquishes reproducing the content received over from the streaming server 104 and the multimedia device 102A commences reproduction of the content received from the streaming server 104, because of the determination by the control server 103 within the multimedia device 102A, that the received information relating to measured signal strength of the wireless messages 150 received by the multimedia device 102B is less than the maintained signal strength that the control server 103 has stored from the multimedia device 102A. The multimedia device 102A begins to play the content stream that it receives from the streaming server 104, because the mobile wireless device 100 is now closer to multimedia device 102A. The multimedia device 102B becomes silent since it is farther from the mobile wireless device 100. Both the streaming server and the control sever may also be placed into the multimedia device, such as device 102A.

Figure 2:
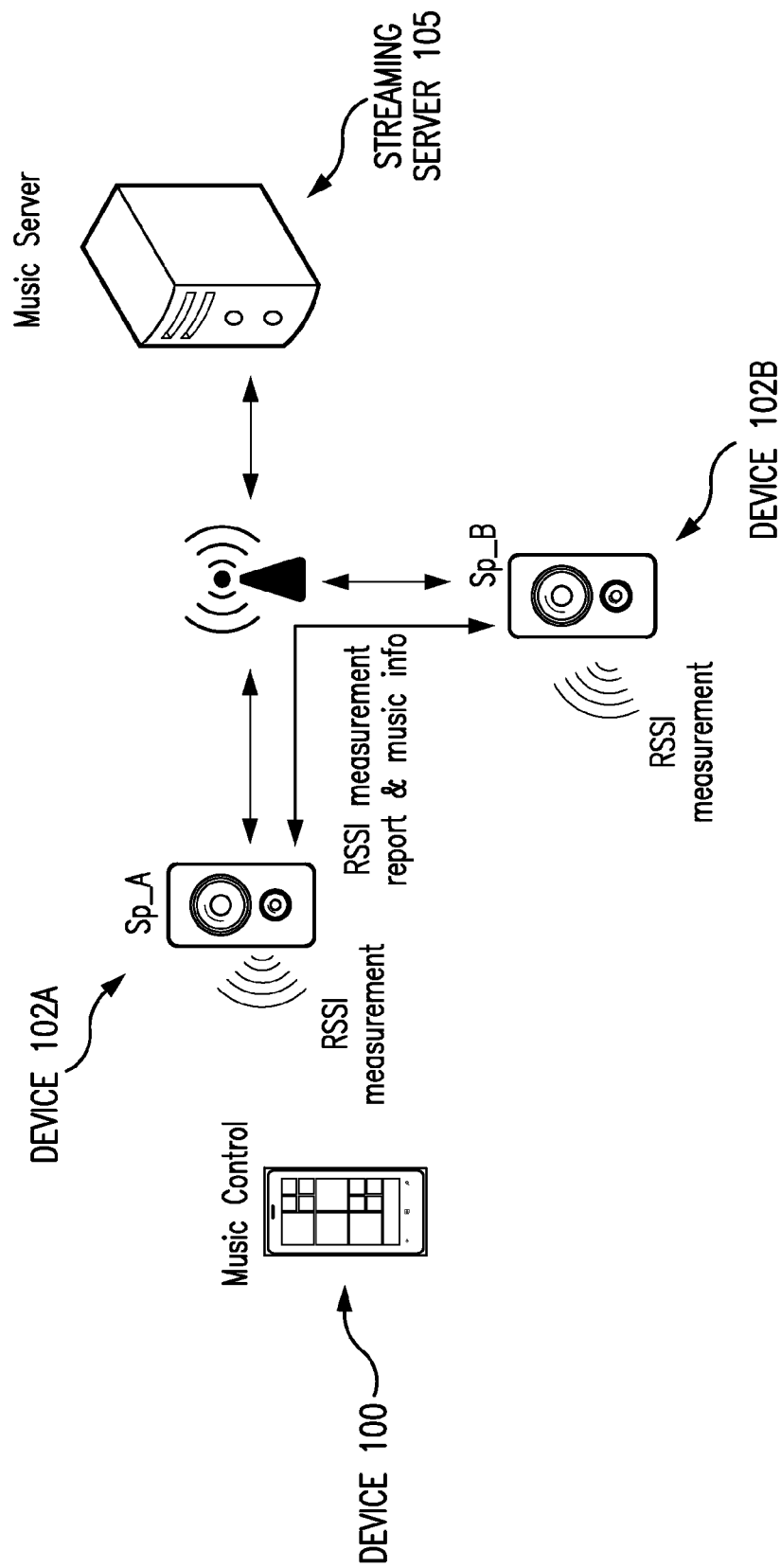
FIG. 2 is an illustration of an example embodiment of a wireless network of a mobile wireless device moving in the vicinity of two wireless multimedia devices. The mobile device may control music by selecting which song is played from the music server. Multimedia device A and multimedia device B receive a music stream from the server. Multimedia device A and multimedia device B also the measure signal strength of wireless discovery messages from the mobile device. The mobile device does not have to be connected to the multimedia devices, but it may remain a discoverable device. The multimedia devices track the position of the mobile device, in accordance with at least one embodiment of the present invention.

FIG. 2 is an illustration of an example embodiment of a wireless network of a mobile wireless device 100 moving in the vicinity of two multimedia devices 102A and 102B. The mobile device may control music by selecting which song is played from the music server 104. Multimedia device 102A and multimedia device 102B receive a music stream from the server 104. Multimedia device 102A and multimedia device 102B also the measure signal strength of wireless discovery messages 150 from the mobile device 100. The mobile device 100 does not have to be connected to the multimedia devices 102A and 102B, but it may remain an advertising device. The multimedia devices 102A and 102B track the position of the mobile device 100, in accordance with at least one embodiment of the present invention.

Figure 3:
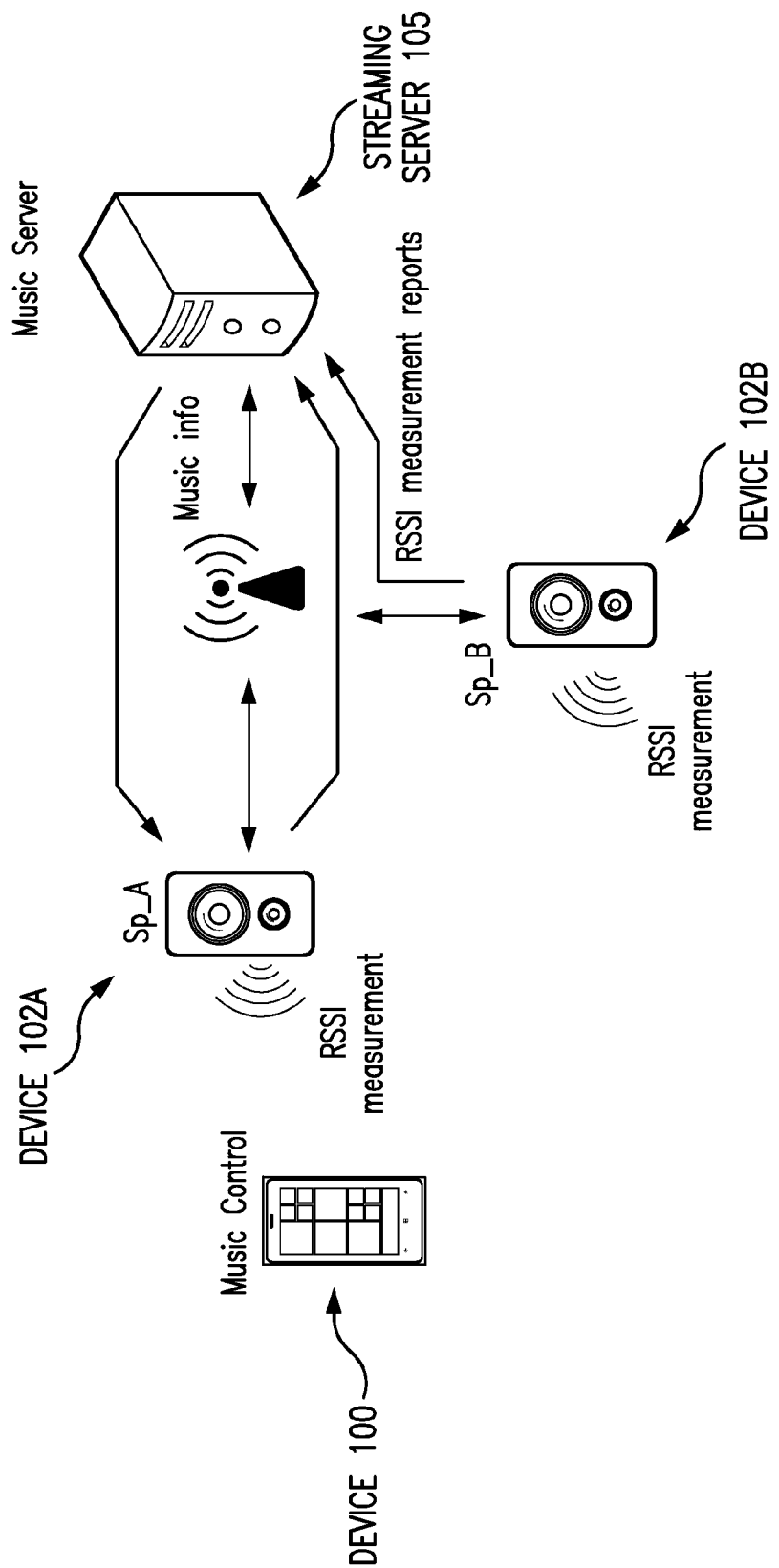
FIG. 3 is an illustration of an example embodiment of a wireless network of a mobile wireless device moving in the vicinity of two wireless multimedia devices. The multimedia devices communicate with the server and the server keeps track of the multimedia devices' measurements of the wireless discovery messages from the mobile device. The server may control which multimedia device is playing and what content is being played. In this example embodiment, the multimedia device only reports its RSSI measurements to the server. The server sends the corresponding content stream to the multimedia device and the server may control the playback, in accordance with at least one embodiment of the present invention.

FIG. 3 is an illustration of an example embodiment of a wireless network of a mobile wireless device 100 moving in the vicinity of two multimedia devices 102A and 102B. The multimedia devices 102A and 102B communicate with the server 105 and the server 105 keeps track of the multimedia devices' measurements of the wireless discovery messages 150 from the mobile device 100. The server 150 may control which multimedia device 102A or 102B is playing and what content is being played. In this example embodiment, the multimedia device only reports its RSSI measurements to the server 105. The server 105 sends the corresponding content stream to the multimedia device and the server 105 may control the playback, in accordance with at least one embodiment of the present invention.

Figure 4:
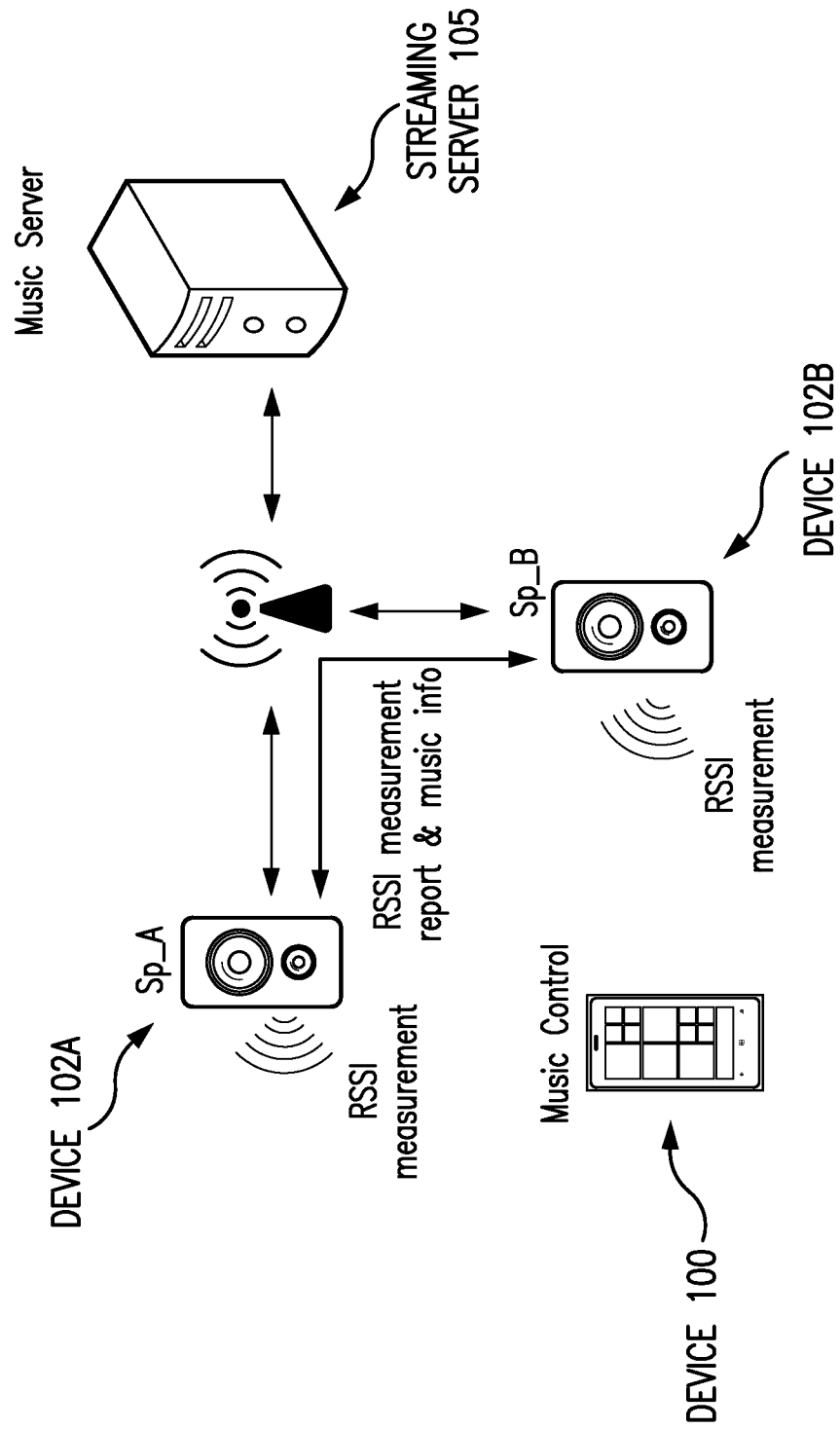
FIG. 4 is an illustration of an example embodiment of a wireless network of a mobile wireless device moving in the vicinity of two wireless multimedia devices. When the mobile device moves closer to the multimedia device B, then multimedia device B transmits a report that indicates it is receiving a stronger signal than is being reported by the multimedia device A. Multimedia device B then indicates to multimedia device A that multimedia device B will continue to play the content stream and, in response, multimedia device A stops playing the content stream. An indication of which song is being streamed and the current playing position in the song is reported from multimedia device A to multimedia device B, either together with the RSSI reports or separately in a different report, in accordance with at least one embodiment of the present invention.

FIG. 4 is an illustration of an example embodiment of a wireless network of a mobile wireless device 100 moving in the vicinity of two multimedia devices 102A and 102B. When the mobile device 100 moves closer to the multimedia device 102B, then multimedia device 102B transmits a report that indicates it is receiving a stronger signal than is being reported by the multimedia device 102A. Multimedia device 102B then indicates to multimedia device 102A that multimedia device 102B will continue to play the content stream B and, in response, multimedia device 102A stops playing the content stream A. An indication of which song is being streamed and the current playing position in the song is reported from multimedia device 102A to multimedia device 102B, either together with the RSSI reports or separately in a different report, in accordance with at least one embodiment of the present invention.

Figure 5:
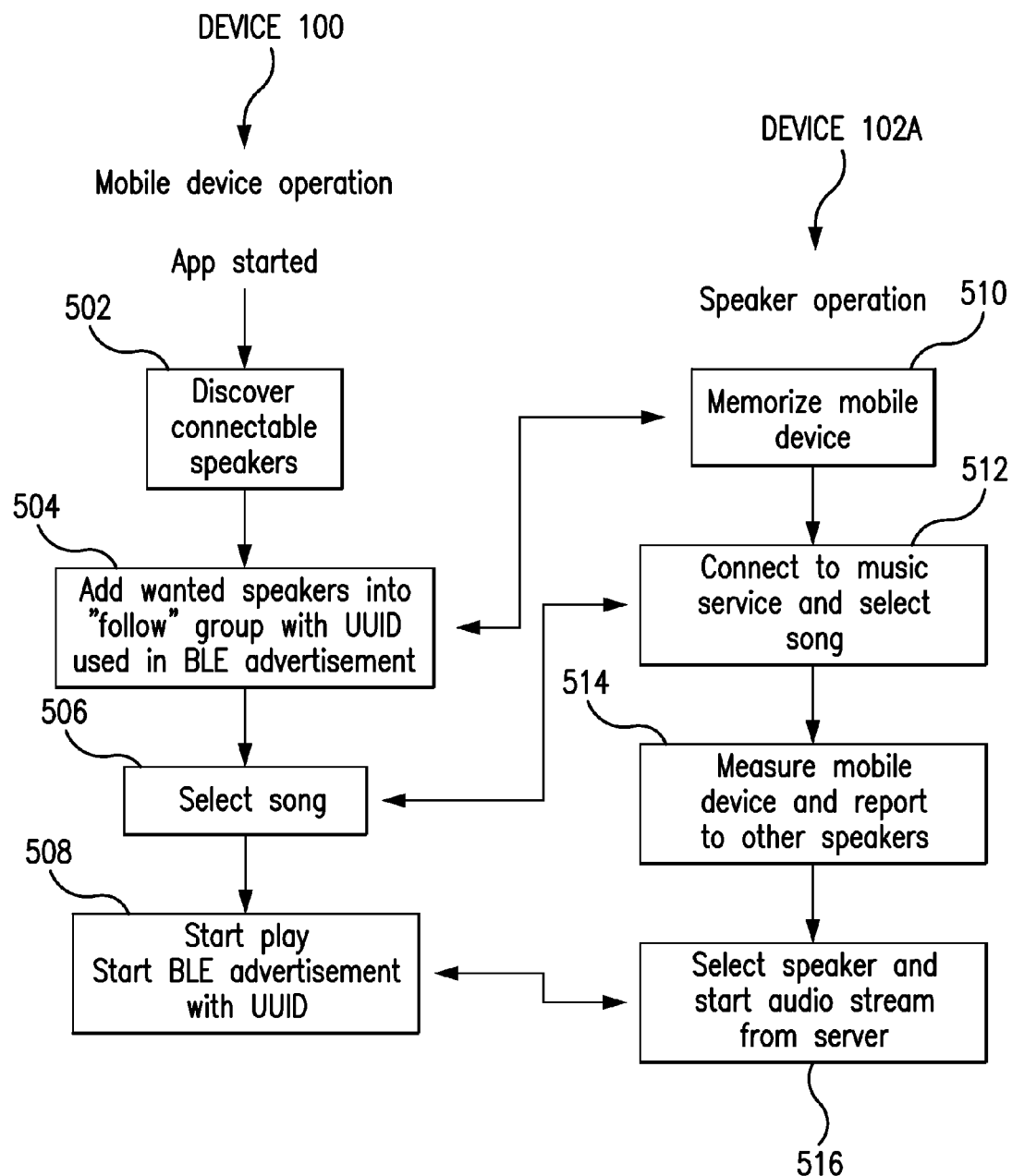
FIG. 5 is an example flow diagram for the interaction of mobile wireless device and the multimedia device A, for example. When the Mobile device application is started, the mobile device selects multimedia devices to be incorporated into a play group that will offer the "follow" feature. The group of devices may be based, for example, of a group formed in earlier usages, a group identified from external source, a group formed by the user by selecting known devices, a group based on a search of connectable devices in the network, a group formed from a list of devices received from one or more device, or a combination of these. When multimedia devices are selected, the user may select a song or video and the multimedia device starts playing that song or video, in accordance with at least one embodiment of the present invention.

FIG. 5 is an example flow diagram for the interaction of mobile wireless device 100 and the multimedia device 102A, for example. When the Mobile device application is started, the mobile device 100 selects in steps 502 and 504 which of the multimedia devices is to be incorporated into a play group that will offer the "follow" feature. The group of devices may be based, for example, of a group formed in earlier usages, a group identified from external source, a group formed by the user by selecting known devices, a group based on a search of connectable devices in the network, a group formed from a list of devices received from one or more device, or a combination of these. When multimedia devices are selected for the group, the user may select a song at step 506 and the wireless mobile device 100 starts transmitting Bluetooth LE advertising packets. The multimedia device 102A memorizes the identity of the wireless mobile device at step 510. The multimedia device 102A connects to the music streaming service of the server 105 and selects the song or video to play at step 512. The multimedia device 102A measures the RSSI of the advertising packets that it receives from the wireless mobile device 100 at step 514. The multimedia device 102A then selects the multimedia device and starts playing the audio stream from the server at step 516, in accordance with at least one embodiment of the present invention.

Figure 6A:
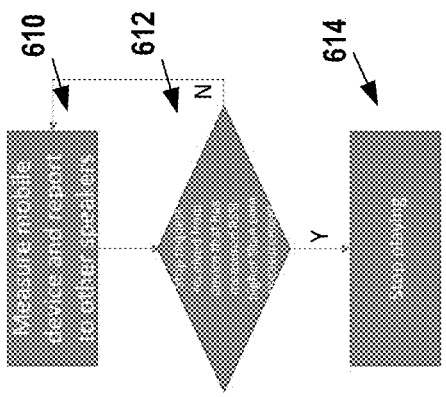
FIG. 6A is an example flow diagram for the a multimedia device A that is not currently playing, but begins to play when it determines that its measured RSSI is greater than the other multimedia device's measured RSSI, in accordance with at least one embodiment of the present invention.

FIG. 6A is an example flow diagram for the a multimedia device 102A that is not currently playing, but begins to play when it determines that its measured RSSI is greater than the other multimedia device's measured RSSI. In step 602, multimedia device 102A measures the RSSI from mobile device 100 and reports the measured RSSI to other multimedia devices. In step 604, the measured RSSI is determined to be greater than the RSSI reported by any other multimedia device. In step 606, the multimedia device 102A asks the multimedia device 102B to stop its currently playing and the multimedia device 102A then begins to play the content streamed by the server, continuing from where the multimedia device 102B stopped, in accordance with at least one embodiment of the present invention.

Figure 6B:
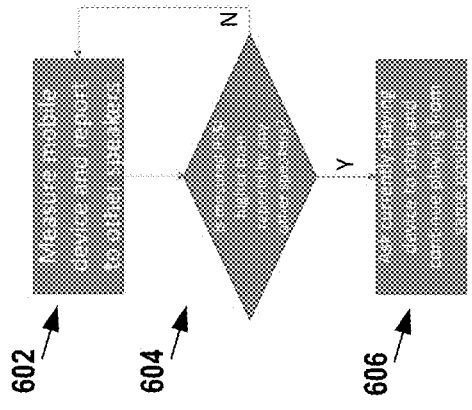
FIG. 6B is an example flow diagram for the a multimedia device B that is currently playing, but relinquishes playing when it determines that its measured RSSI is less than the other multimedia device's measured RSSI, in accordance with at least one embodiment of the present invention.

FIG. 6B is an example flow diagram for the a multimedia device B that is currently playing, but relinquishes playing when it determines that its measured RSSI is less than the other multimedia device's measured RSSI. In step 610, multimedia device 102B measures the RSSI from mobile device 100 and reports the measured RSSI to other multimedia devices. In step 612, multimedia device 102B receives a stop request from multimedia device 102A, since multimedia device A reports that its measured RSSI is determined to be greater than the RSSI measured by multimedia device 102B. In step 614, multimedia device B stops playing the content streamed by the server, in accordance with at least one embodiment of the present invention.

Figure 7:
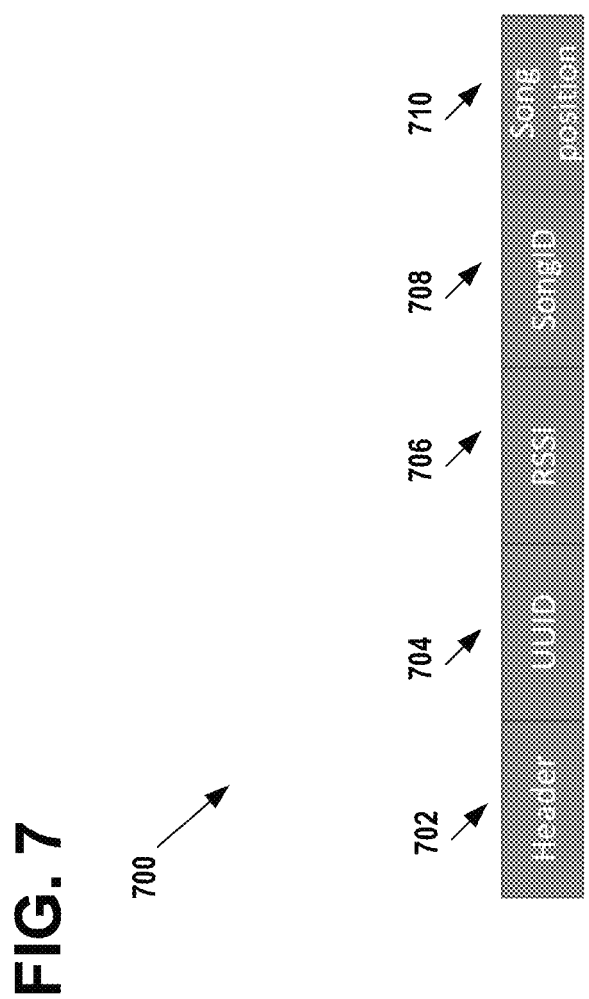
FIG. 7 is an illustration of an example RSSI report packet. The packet may have a header to indicate that this is an RSSI report packet. The UUID field will identify the measured mobile device. The RSSI field will indicated latest RSSI measurement of that device. The SongID field indicates the currently played song and the Song position indicates the playing position, in accordance with at least one embodiment of the present invention.

FIG. 7 is an illustration of an example RSSI report packet transmitted by each multimedia device 102A and 102B. The packet 700 may have a header 702 to indicate that this is an RSSI report packet. The UUID field 704 will identify the measured mobile device 100. The RSSI field 706 will indicated latest RSSI measurement of that device. The SongID field 708 indicates the currently played song and the Song position field 710 indicates the playing position, in accordance with at least one embodiment of the present invention.

Figure 8B:
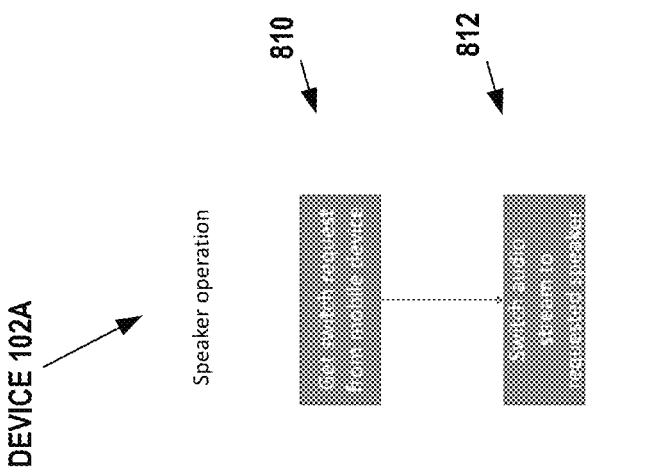
FIG. 8B is an illustration of an example flow diagram of an example process in the wireless multimedia device A, carrying out the example operations, in accordance with at least one embodiment of the present invention.
Figure 8A:
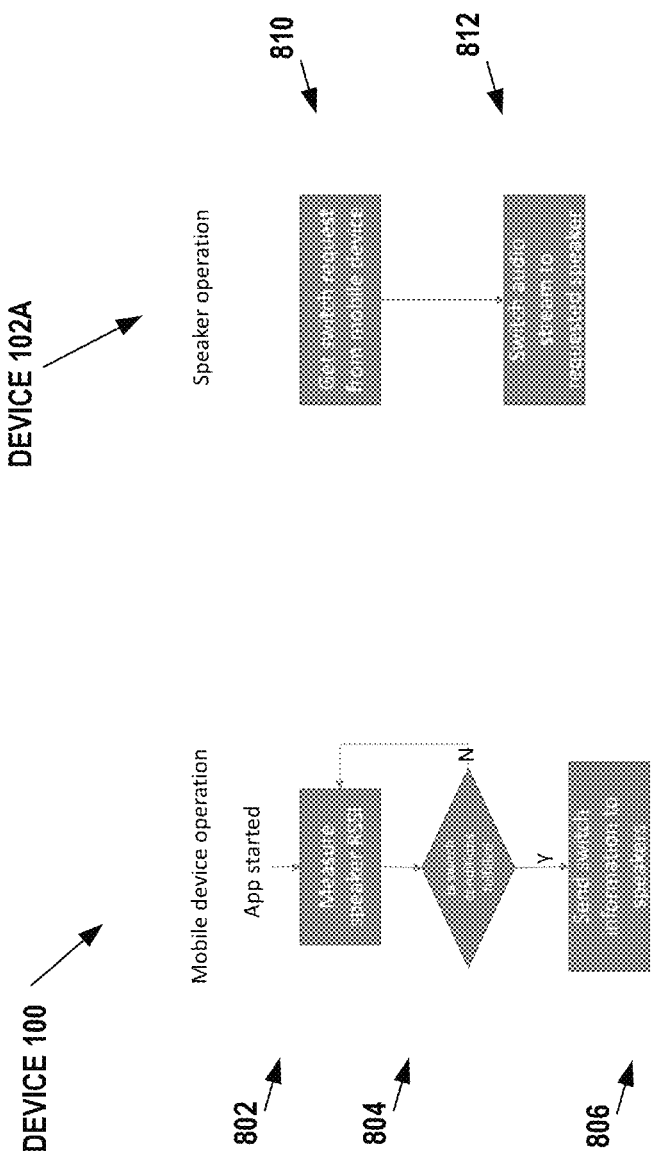
FIG. 8A is an illustration of an example flow diagram of an example process in the mobile wireless device carrying out the example operations, in accordance with at least one embodiment of the present invention.

FIG. 8A is an illustration of an example flow diagram of an example alternate process in the mobile wireless device 100 carrying out example alternate operations, in accordance with at least one embodiment of the present invention. In Step 802 the mobile wireless device 100 measures the RSSI of the multimedia device 102A. In Step 804 the mobile wireless device 100 determines if switch conditions have been fulfilled. In Step 806 the mobile wireless device 100 sends switch information to the multimedia devices.

FIG. 8B is an illustration of an example flow diagram of an example alternate process in the wireless multimedia device 102A, carrying out example alternate operations, in accordance with at least one embodiment of the present invention. In step 810, the multimedia device 102A receives a switch request from the mobile wireless device 100. In step 812, the multimedia device 102A switches the audio stream to the requested multimedia device.

FIG. 9A is an illustration of an example flow diagram 900 of an example process in the multimedia device 102B relinquishing reproducing content received from the server 105 when the received information relating to measured signal strength of the wireless messages 150 received by the other multimedia device 102A is greater than the maintained signal strength associated with the mobile wireless device 100, in accordance with at least one embodiment of the present invention. The steps of the flow diagram represent computer code instructions stored in the RAM and/or ROM memory of the multimedia device 102B, which when executed by the central processing units (CPU) 125, carry out the functions of the example embodiments of the invention. The steps may be carried out in another order than shown and individual steps may be combined or separated into component steps. The flow diagram has the following steps:

Step 902: scanning, by an apparatus, for wireless messages associated with presence of a mobile wireless device, while the apparatus is connected to a server;

Step 904: reproducing, by the apparatus, content received from the server;

Step 906: maintaining, by the apparatus, measured signal strength of wireless messages received from the mobile wireless device; and Step 908: relinquishing, by the apparatus, reproducing content received from the server based on information relating to measured signal strength of wireless messages received by another wireless device from the mobile wireless device is greater than the maintained signal strength associated with the mobile wireless device.

FIG. 9B is an illustration of an example flow diagram 950 of an example process in the multimedia device 102A, commencing reproduction of content received from the server when the received information relating to measured signal strength of the wireless messages received by the other multimedia device 102B is less than the maintained signal strength associated with the mobile wireless device, in accordance with at least one embodiment of the present invention. The steps of the flow diagram represent computer code instructions stored in the RAM and/or ROM memory of the multimedia device 102A, which when executed by the central processing units (CPU) 125, carry out the functions of the example embodiments of the invention. The steps may be carried out in another order than shown and individual steps may be combined or separated into component steps. The flow diagram has the following steps:

Step 952: scanning, by an apparatus, for wireless messages associated with presence of a mobile wireless device, while the apparatus is connected to a server;

Step 954: maintaining, by the apparatus, measured signal strength of wireless messages received from the mobile wireless device; and Step 956: commencing, by the apparatus, reproduction of content received from the server based on information relating to measured signal strength of the wireless messages received by another device from the mobile wireless device is less than the maintained signal strength associated with the mobile wireless device.

FIG. 9C is an illustration of an example flow diagram 960 of an example process in the multimedia device 102B relinquishing reproducing content received from the streaming server 104 based on the measured signal strength of wireless messages received from the mobile wireless device being less than a predefined signal strength, in accordance with at least one embodiment of the present invention. The steps of the flow diagram represent computer code instructions stored in the RAM and/or ROM memory of the multimedia device 102B, which when executed by the central processing units (CPU) 125, carry out the functions of the example embodiments of the invention. The steps may be carried out in another order than shown and individual steps may be combined or separated into component steps. The flow diagram has the following steps:

Step 962: scanning, by an apparatus, for wireless messages associated with presence of a mobile wireless device, while the apparatus is connected to a server;

Step 964: reproducing, by the apparatus, content received from the server;

Step 966: maintaining, by the apparatus, measured signal strength of wireless messages received from the mobile wireless device; and Step 968: relinquishing, by the apparatus, reproduction of content received from the server based on the measured signal strength of wireless messages received from the mobile wireless device being less than a predefined signal strength.

Figure 9D:
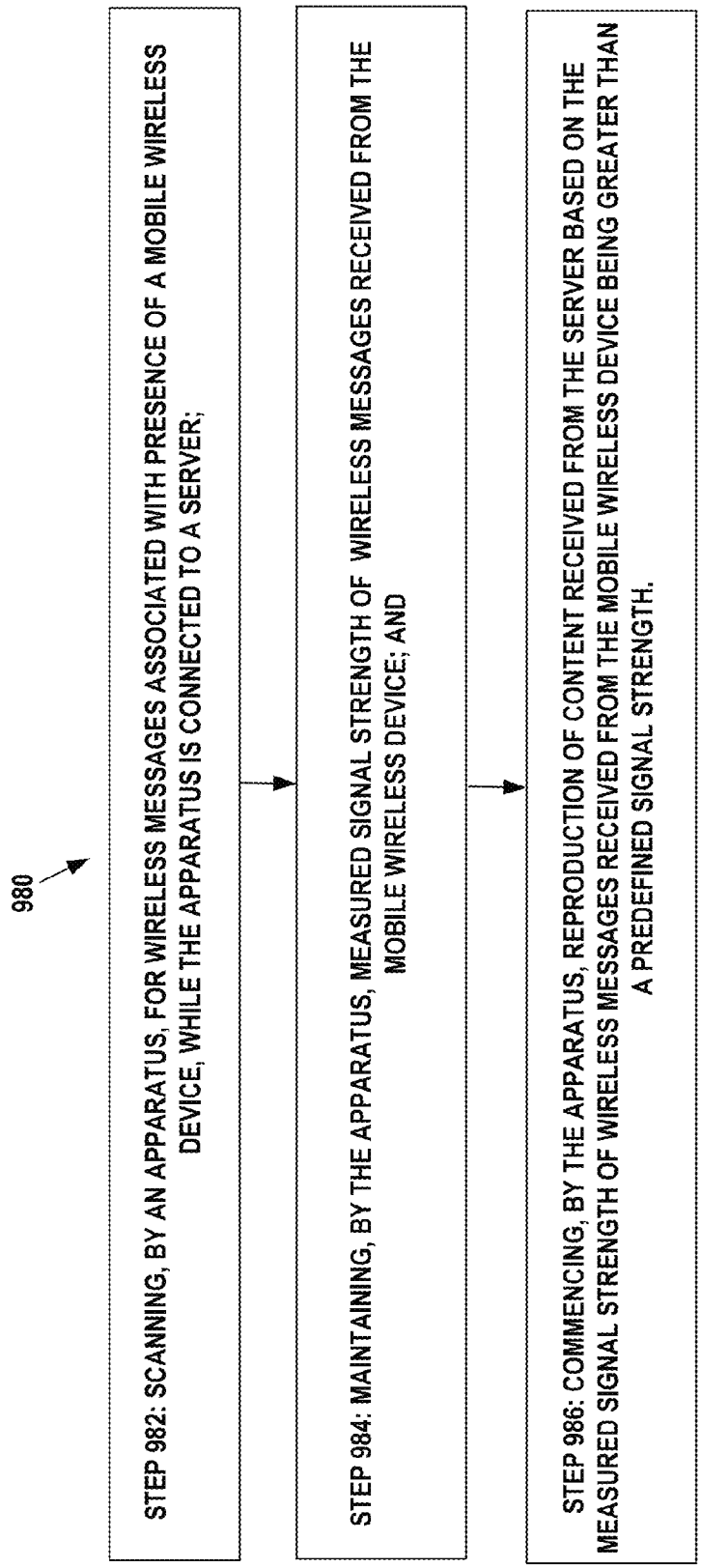
FIG. 9D is an illustration of an example flow diagram 980 of an example process in the multimedia device 102A, commencing reproduction of content received from the streaming server 104 based on the measured signal strength of wireless messages received from the mobile wireless device being greater than a predefined signal strength, in accordance with at least one embodiment of the present invention.

FIG. 9D is an illustration of an example flow diagram 980 of an example process in the multimedia device 102A, commencing reproduction of content received from the streaming server 104 based on the measured signal strength of wireless messages received from the mobile wireless device being greater than a predefined signal strength, in accordance with at least one embodiment of the present invention. The steps of the flow diagram represent computer code instructions stored in the RAM and/or ROM memory of the multimedia device 102A, which when executed by the central processing units (CPU) 125, carry out the functions of the example embodiments of the invention. The steps may be carried out in another order than shown and individual steps may be combined or separated into component steps. The flow diagram has the following steps:

Step 982: scanning, by an apparatus, for wireless messages associated with presence of a mobile wireless device, while the apparatus is connected to a server;

Step 984: maintaining, by the apparatus, measured signal strength of wireless messages received from the mobile wireless device; and Step 986: commencing, by the apparatus, reproduction of content received from the server based on the measured signal strength of wireless messages received from the mobile wireless device being greater than a predefined signal strength.

FIG. 10 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
    scanning, by an apparatus, for wireless device discovery messages associated with presence of a mobile wireless device to which the apparatus is not connected, while the apparatus is connected to a server;
    reproducing, by the apparatus, content received from the server;
    measuring, by the apparatus, signal strength of the wireless device discovery messages associated with the presence of the mobile wireless device to which the apparatus is not connected;
    maintaining, by the apparatus, the measured signal strength of the wireless device discovery messages received from the mobile wireless device to which the apparatus is not connected;
    receiving, by the apparatus, from another wireless device capable of reproducing content received from the server, information relating to a measured signal strength of wireless messages received by the other wireless device from the mobile wireless device;
    comparing, by the apparatus, the received information relating to the measured signal strength of wireless messages received by the other wireless device, with the maintained signal strength associated with the mobile wireless device; and
    relinquishing, by the apparatus, reproducing content received from the server, when the information relating to the measured signal strength of wireless device discovery messages received by the other device from the mobile wireless device to which the apparatus is not connected is greater than the maintained signal strength of the wireless device discovery messages associated with the mobile wireless device to which the apparatus is not connected.

2. The method of claim 1, wherein the information relating to the measured signal strength of wireless messages received by the other wireless device, is received from at least one of the other wireless device or the server.

3. The method of claim 1, wherein the relinquishing reproducing content received from the server, is performed when the information relating to measured signal strength of the wireless messages received by the other wireless device is greater than the maintained signal strength associated with a first wireless device, by a predefined margin or by a predefined margin for a predefined interval.

4. A method, comprising:
    scanning, by an apparatus, for wireless device discovery messages associated with presence of a mobile wireless device to which the apparatus is not connected, while the apparatus is connected to a server;
    measuring, by the apparatus, signal strength of the wireless device discovery messages associated with the presence of the mobile wireless device to which the apparatus is not connected;
    maintaining, by the apparatus, the measured signal strength of the wireless device discovery messages received from the mobile wireless device to which the apparatus is not connected;
    receiving, by the apparatus, from another wireless device currently reproducing content it receives over a connection from the server, information relating to measured signal strength of wireless messages received by the other wireless device from the mobile wireless device;
    comparing, by the apparatus, the received information relating to the measured signal strength of wireless messages received by the other wireless device, with the maintained signal strength associated with the mobile wireless device; and
    commencing, by the apparatus, reproduction of content received from the server when the information relating to the measured signal strength of wireless device discovery messages received by the other wireless device from the mobile wireless device to which the apparatus is not connected is less than the maintained signal strength of the wireless device discovery messages associated with the mobile wireless device to which the apparatus is not connected.

5. The method of claim 4, wherein the information relating to a measured signal strength of wireless messages received by the other wireless device, is received from at least one of the other wireless device or the server.

6. The method of claim 4, wherein the commencing reproduction of content received from the server is performed when the information relating to measured signal strength of the wireless messages received by the other wireless device is less than the maintained signal strength associated with a first wireless device, by a predefined margin or by a predefined margin for a predefined interval.

7. An apparatus, comprising:
    at least one processor;
    at least one memory including computer program code;
    the at least one memory and the computer program code configured to, with the at least one processor, cause the apparatus at least to:

scan for wireless device discovery messages associated with presence of a mobile wireless device to which the apparatus is not connected, while the apparatus is connected to a server;

reproduce content received from the server;

measure signal strength of the wireless device discovery messages associated with the presence of the mobile wireless device to which the apparatus is not connected;

maintain the measured signal strength of the wireless device discovery messages received from the mobile wireless device to which the apparatus is not connected;

receive from another wireless device capable of reproducing content received from the server, information relating to a measured signal strength of wireless messages received by the other wireless device from the mobile wireless device;

compare the received information relating to the measured signal strength of wireless messages received by the other wireless device, with the maintained signal strength associated with the mobile wireless device; and relinquish reproducing content received from the server when the information relating to the measured signal strength of wireless device discovery messages received by the other wireless device from the mobile wireless device to which the apparatus is not connected is greater than the maintained signal strength of the wireless device discovery messages associated with the mobile wireless device to which the apparatus is not connected.

8. The apparatus of claim 7, wherein the information relating to the measured signal strength of wireless messages received by the other wireless device, is received from at least one of the other wireless device or the server.

9. The apparatus of claim 7, wherein the relinquishing reproducing content received from the server is performed when the information relating to measured signal strength of the wireless messages received by the other wireless device is greater than the maintained signal strength associated with a first wireless device, by a predefined margin or by a predefined margin for a predefined interval.

10. An apparatus, comprising:
at least one processor;
at least one memory including computer program code;
the at least one memory and the computer program code configured to, with the at least one processor, cause the apparatus at least to:

scan for wireless device discovery messages associated with presence of a mobile wireless device to which the apparatus is not connected, while the apparatus is connected to a server;

measure signal strength of the wireless device discovery messages associated with the presence of the mobile wireless device to which the apparatus is not connected;

maintain the measured signal strength of the wireless device discovery messages received from the mobile wireless device to which the apparatus is not connected;

receive from another wireless device currently reproducing content it receives over a connection from the server, information relating to measured signal strength of wireless messages received by the other wireless device from the mobile wireless device;

compare the received information relating to the measured signal strength of wireless messages received by the other wireless device, with the maintained signal strength associated with the mobile wireless device; and commence reproduction of content received from the server when the information relating to the measured signal strength of wireless device discovery messages received by the other wireless device from the mobile wireless device to which the apparatus is not connected is less than the maintained signal strength of the wireless device discovery messages associated with the mobile wireless device to which the apparatus is not connected.

11. The apparatus of claim 10, wherein the information relating to a measured signal strength of wireless messages received by the other wireless device, is received from at least one of the other wireless device or the server.

12. The apparatus of claim 10, wherein the commencing reproduction of content received from the server is performed when the information relating to measured signal strength of the wireless messages received by the other wireless device is less than the maintained signal strength associated with a first wireless device, by a predefined margin or by a predefined margin for a predefined interval.

13. A computer program product comprising computer executable program code recorded on a computer readable, non-transitory storage medium, the computer executable program code comprising:

code for scanning, by an apparatus, for wireless device discovery messages associated with presence of a mobile wireless device to which the apparatus is not connected, while the apparatus is connected to a server;

code for reproducing, by the apparatus, content received from the server;

code for measuring, by the apparatus, signal strength of the wireless device discovery messages associated with the presence of the mobile wireless device to which the apparatus is not connected;

code for maintaining, by the apparatus, the measured signal strength of the wireless device discovery messages received from the mobile wireless device to which the apparatus is not connected;

code for receiving, by the apparatus, from another wireless device capable of reproducing content received from the server, information relating to a measured signal strength of wireless messages received by the other wireless device from the mobile wireless device;

code for comparing, by the apparatus, the received information relating to the measured signal strength of wireless messages received by the other wireless device, with the maintained signal strength associated with the mobile wireless device; and code for relinquishing, by the apparatus, reproducing content received from the server, when the information relating to the measured signal strength of wireless device discovery messages received by the other device from the mobile wireless device to which the apparatus is not connected is greater than the maintained signal strength of the wireless device discovery messages associated with the mobile wireless device to which the apparatus is not connected.

14. A computer program product comprising computer executable program code recorded on a computer readable, non-transitory storage medium, the computer executable program code comprising:

code for scanning, by an apparatus, for wireless device discovery messages associated with presence of a mobile wireless device to which the apparatus is not connected, while the apparatus is connected to a server;

code for measuring, by the apparatus, signal strength of the wireless device discovery messages associated with the presence of the mobile wireless device to which the apparatus is not connected;

code for maintaining, by the apparatus, the measured signal strength of the wireless device discovery messages received from the mobile wireless device to which the apparatus is not connected;

code for receiving, by the apparatus, from another wireless device currently reproducing content it receives over a connection from the server, information relating to measured signal strength of wireless messages received by the other wireless device from the mobile wireless device;

code for comparing, by the apparatus, the received information relating to the measured signal strength of wireless messages received by the other wireless device, with the maintained signal strength associated with the mobile wireless device; and code for commencing, by the apparatus, reproduction of content received from the server when the information relating to the measured signal strength of wireless device discovery messages received by the other wireless device from the mobile wireless device to which the apparatus is not connected is less than the maintained signal strength of the wireless device discovery messages associated with the mobile wireless device to which the apparatus is not connected.

15. A method, comprising:

scanning, by an apparatus, for wireless device discovery messages associated with presence of a mobile wireless device to which the apparatus is not connected, while the apparatus is connected to a server;

reproducing, by the apparatus, content received from the server;

measuring, by the apparatus, signal strength of the wireless device discovery messages associated with the presence of the mobile wireless device to which the apparatus is not connected;

maintaining, by the apparatus, the measured signal strength of the wireless device discovery messages received from the mobile wireless device to which the apparatus is not connected;

receiving, by the apparatus, from another wireless device capable of reproducing content received from the server, information relating to a measured signal strength of wireless messages received by the other wireless device from the mobile wireless device;

comparing, by the apparatus, the received information relating to the measured signal strength of wireless messages received by the other wireless device, with the maintained signal strength associated with the mobile wireless device; and relinquishing, by the apparatus, reproduction of content received from the server when the measured signal strength of the wireless device discovery messages received from the mobile wireless device to which the apparatus is not connected being less than a predefined signal strength of the received information relating to the measured signal strength of wireless messages received by the other wireless device.

16. An apparatus, comprising:

at least one processor;

at least one memory including computer program code;

the at least one memory and the computer program code configured to, with the at least one processor, cause the apparatus at least to:

scan for wireless device discovery messages associated with presence of a mobile wireless device to which the apparatus is not connected, while the apparatus is connected to a server;

reproduce content received from the server;

measure signal strength of the wireless device discovery messages associated with the presence of the mobile wireless device to which the apparatus is not connected;

maintain the measured signal strength of the wireless device discovery messages received from the mobile wireless device to which the apparatus is not connected;

receive from another wireless device capable of reproducing content received from the server, information relating to a measured signal strength of wireless messages received by the other wireless device from the mobile wireless device;

compare the received information relating to the measured signal strength of wireless messages received by the other wireless device, with the maintained signal strength associated with the mobile wireless device; and relinquish reproduction of content received from the server when the measured signal strength of the wireless device discovery messages received from the mobile wireless device to which the apparatus is not connected being less than a predefined signal strength of the received information relating to the measured signal strength of wireless messages received by the other wireless device.

17. A computer program product comprising computer executable program code recorded on a computer readable, non-transitory storage medium, the computer executable program code comprising:

code for scanning, by an apparatus, for wireless device discovery messages associated with presence of a mobile wireless device to which the apparatus is not connected, while the apparatus is connected to a server;

code for reproducing, by the apparatus, content received from the server;

code for measuring, by the apparatus, signal strength of the wireless device discovery messages associated with the presence of the mobile wireless device to which the apparatus is not connected;

code for maintaining, by the apparatus, the measured signal strength of the wireless device discovery messages received from the mobile wireless device to which the apparatus is not connected;

code for receiving, by the apparatus, from another wireless device capable of reproducing content received from the server, information relating to a measured signal strength of wireless messages received by the other wireless device from the mobile wireless device;

code for comparing, by the apparatus, the received information relating to the measured signal strength of wireless messages received by the other wireless device, with the maintained signal strength associated with the mobile wireless device; and code for relinquishing, by the apparatus, reproduction of content received from the server when the measured signal strength of the wireless device discovery messages received from the mobile wireless device to which the apparatus is not connected being less than a predefined signal strength of the received information relating to the measured signal strength of wireless messages received by the other wireless device.

* * * * *